US007048505B2

(12) United States Patent
Segota et al.

(10) Patent No.: US 7,048,505 B2
(45) Date of Patent: May 23, 2006

(54) METHOD AND SYSTEM FOR REGULATING FLUID FLOW OVER AN AIRFOIL OR A HYDROFOIL

(76) Inventors: Darko Segota, 7432 S. Magic View Cir., Salt Lake City, UT (US) 84121; John W. Finnegan, II, P.O. Box 245, Oakley, UT (US) 84055

( * ) Notice: Subject to any disclaimer, the term of this patent is extended or adjusted under 35 U.S.C. 154(b) by 0 days.

(21) Appl. No.: 10/600,922

(22) Filed: Jun. 19, 2003

(65) Prior Publication Data

US 2005/0106016 A1    May 19, 2005

Related U.S. Application Data

(60) Provisional application No. 60/390,510, filed on Jun. 21, 2002.

(51) Int. Cl.
*F04D 29/68* (2006.01)
(52) U.S. Cl. .................... 415/914; 416/62; 416/236 R; 244/130
(58) Field of Classification Search ............... 415/914, 415/191; 416/62, 228, 236 R, 236 A; 244/130, 244/200
See application file for complete search history.

(56) References Cited

U.S. PATENT DOCUMENTS

| 3,056,277 | A |   | 10/1962 | Brenner ......................... 73/23 |
|-----------|---|---|---------|-----------------------------------------|
| 4,171,785 | A |   | 10/1979 | Isenberg ..................... 244/123 |
| 4,228,943 | A |   | 10/1980 | Tanabe et al. .............. 228/182 |
| 4,449,211 | A |   | 5/1984  | Schmidt et al. ............. 367/153 |
| 4,606,519 | A | * | 8/1986  | Fertis et al. ................ 244/200 |
| 4,619,423 | A |   | 10/1986 | Holmes et al. ............. 244/130 |
| 4,668,443 | A |   | 5/1987  | Rye ............................ 261/112 |
| 4,699,340 | A |   | 10/1987 | Rethorst ..................... 244/199 |
| 4,813,631 | A |   | 3/1989  | Gratzer ........................ 244/35 |

(Continued)

OTHER PUBLICATIONS

Aerodynamic DRAG; file://E:\STUDY\Aerodynamic%20 Drag%20at%20High% 20Speeds.htm; 9 pgs; Jun. 6, 2003.

(Continued)

*Primary Examiner*—Edward K. Look
*Assistant Examiner*—Dwayne J. White
(74) *Attorney, Agent, or Firm*—Kirton & McConkie; Michael F. Krieger

(57) ABSTRACT

The present invention features a fluid flow regulator that functions to significantly influence fluid flow across an airfoil or hydrofoil, as well as various rotating or rotary devices, including propellers, impellers, turbines, rotors, fans, and other similar devices, as well as to significantly effect the performance of airfoils and hydrofoils and these rotary devices subjected to a fluid. The fluid flow regulator comprises a pressure recovery drop that induces a sudden drop in pressure at an optimal pressure recovery point on the surface, such that a sub-atmospheric barrier is created that serves as a cushion between the molecules in the fluid and the molecules at the airfoil's or hydrofoil's surface. More specifically, the present invention fluid flow regulator functions to significantly regulate the pressure gradients that exist along the surface of an airfoil or hydrofoil. Regulation of pressure gradients is accomplished by selectively reducing the pressure drag at various locations along the surface, as well as the pressure drag induced forward and aft of the airfoil or hydrofoil, via the pressure recovery drop. Reducing the pressure drag in turn increases pressure recovery or pressure recovery potential, which pressure recovery subsequently lowers the friction drag along the surface. By reducing or lowering friction drag, the potential for fluid separation is decreased, or in other words, the separation and separation potential of the fluid is significantly reduced.

42 Claims, 20 Drawing Sheets

U.S. PATENT DOCUMENTS

| | | | | |
|---|---|---|---|---|
| 4,851,071 | A | | 7/1989 | Gallimore .................. 156/344 |
| 4,872,484 | A | | 10/1989 | Hickey .................. 137/561 R |
| 4,974,633 | A | | 12/1990 | Hickey .................. 137/561 R |
| 5,133,519 | A | * | 7/1992 | Falco .......................... 244/200 |
| 5,144,099 | A | | 9/1992 | Cardy .......................... 174/66 |
| 5,316,032 | A | | 5/1994 | DeCoux ........................ 137/14 |
| 5,590,854 | A | | 1/1997 | Shatz .......................... 244/206 |
| 5,718,539 | A | | 2/1998 | Segota .......................... 406/61 |
| 5,810,249 | A | | 9/1998 | Nilsson ........................ 239/2.2 |
| 5,863,155 | A | | 1/1999 | Segota .......................... 406/61 |
| 6,180,536 | B1 | | 1/2001 | Chong et al. ................ 438/745 |
| 6,202,304 | B1 | | 3/2001 | Shatz ........................ 29/896.6 |
| 6,263,745 | B1 | | 7/2001 | Buchanan et al. ......... 73/865.5 |
| 6,357,307 | B1 | | 3/2002 | Buchanan et al. ......... 73/865.5 |
| 2001/0004835 | A1 | | 6/2001 | Alkabie et al. ................ 60/757 |
| 2001/0053817 | A1 | | 12/2001 | Anayama et al. ........... 525/107 |

OTHER PUBLICATIONS

Aerodynamics of Wind Turbines: Drag; http://www.windpower.org/en/tour/wtrb/drag.htm; 4 pgs; Sep. 12, 2003.
Airfoils and Lift; http://www.aviation-history.com/theory/airfoil.htm; 2 pgs; Sep. 12, 2003.
Bernoulli Equation; file://E:\STUDY\Pressure.htm; 6 pgs; Jun. 6, 2003.
Boundary layer and turbulence modeling: a persona; perspective; R.A. Brown; 10 pgs; Mar. 20, 1995.
Boundary Layer Control; http://www.aerodyn.org/Drag/blc.html; 4 pgs; Sep. 12, 2003.
Boundary-Layer Separation; http://www.ma.man.ac.uk/~ruban/blsep.html; 4 pgs; Sep. 12, 2003.
Boundary layer and turbulence modeling: a persona; perspective; http://www.atmos.washington.edu/~rabrown/amspblt6.html; 8 pgs; Jun. 4, 2003.
Bubble Plumes and the Coanda; http://66.218.71.225/search/cache?p=coanda+experiments&ei=UTF-8&xargs=0&b=21&url=. . . ; 6 pgs; May 22, 2003.
Chapter 6: Aerodynamics; http://www.scitoys.com/scitoys/scitoys/aero/aero.html; 10 pgs; May 22, 2003.
Coanda Effect: Understanding Why Wings Work; http://www.jefraskin.com/forjef2/jefweb-compiled/published/coanda_effect.html; 21 pgs; May 22, 2003.
The Coanda Effect; http://jnaudin.free.fr/html/coanda.htm; 3 pgs; May 22, 2003.
The Coanda Saucer or the "Repulsin type A" test; http://jnaudin.free.fr/html/repcotst.htm; 6 pgs; May 22, 2003.
The Continuity Equation, the Reynolds Number, the Froude Number; file://E:\STUDY\88_06_04&20The%20Continuity%20Equation,%20the%20Reynolds%20Nu . . . ; 10 pgs; Jun. 6, 2003.
Deltawing; http://www.aero.hut.fi/Englanniksi; 1 pg.
Drag of Blunt Bodies and Streamlined Bodies; http://www.princeton.edu/~asmits/Bicycle_web/blunt.html; 4 pgs; Sep. 12, 2003.
The effects of quadratic drag on the inverse cascade of two-dimensional turbulence; N. Grianik, I. Held, K.S. Smith, and G.K. Vallis; 16 pgs; Jul. 2002.
Henri Coanda; http://www.deltawing.go.ro/history/coanda.htm; 3 pgs; May 22, 2003.
Henri Coanda Romanian Scientist (1886-1972); http://romania-on-line.net/halloffame/CoandaHenri.htm; 3 pgs; May 22, 2003.
Henri Marie Coanda; http://www.allstar.fiu.edu/aero/coanda.htm; 5 pgs; May 22, 2003.
History of The "Coanda Effect"; http://www.geocities.com/ResearchTriangle/Lab/1135/coanda.htm; 13 pgs; May 22, 2003.
Lift, Thrust, Weight, and Drag; http://www.av8n.com/how/htm/4forces.html; 9 pgs; Jun. 4, 2003.
M.E. Research Page; file://E:\STUDY\fish%20separation.htm; 4 pgs; Jun. 6, 2003.
MicroCluster Water; http://www.aquatechnology.net/Microcluster_water.html; 7 pgs; May 22, 2003.
Misinterpretations of Bernoulli's Law; http://www.rz.uni-frankfurt.de/~weltner/Mis6/mis6.html; 11 pgs; Sep. 12, 2003.
A Physical Description of Flight; http://www.aa.washington.edu/faculty/eberhardt/lift.htm; 15 pgs; Sep. 12, 2003.
Post-processing of wake survey data from wind tunnel tests; http://www.nlr.nl/public/facilities/f217-01/; 5 pgs; Jun. 4, 2003.
Pressure; file://E:\STUDY\Pressure7.htm; 3 pgs; Jun. 6, 2003.
Pressure Patterns on the Airfoil; http://www.dynamicflight.com/aerodynamics/pres_patterns/; 2 pgs; Sep. 12, 2003.
The Schauberger's Flying Saucer; http://jnaudin.free.fr/html/repulsin.htm; 7 pgs; May 22, 2003.
Separation on a Free Surface; http://www.mathscam.ac.uk/CASM/essays/abstracts/node84.html; 2 pgs; Sep. 12, 2003.
Similarity Parameters; http://www.lerc.nasa.gov/WWW/K-12/airplane/airsim.html; 3 pgs; Sep. 12, 2003.
Using the Coanda Effect; http://www.aardvark.co.nz/pjet/coanda.shtml; 3 pgs; May 22, 2003.
Virtual Experiments on Drag Reduction; Vladimir Kudriavtsev and M. Jack Braun; 48th Annual Conference of Canadian Aeronautics and Space Institute (CASI), 8th Aerodynamics Section Symposium, Toronto, Canada; 6 pgs; Apr. 29-May 2, 2001.

* cited by examiner

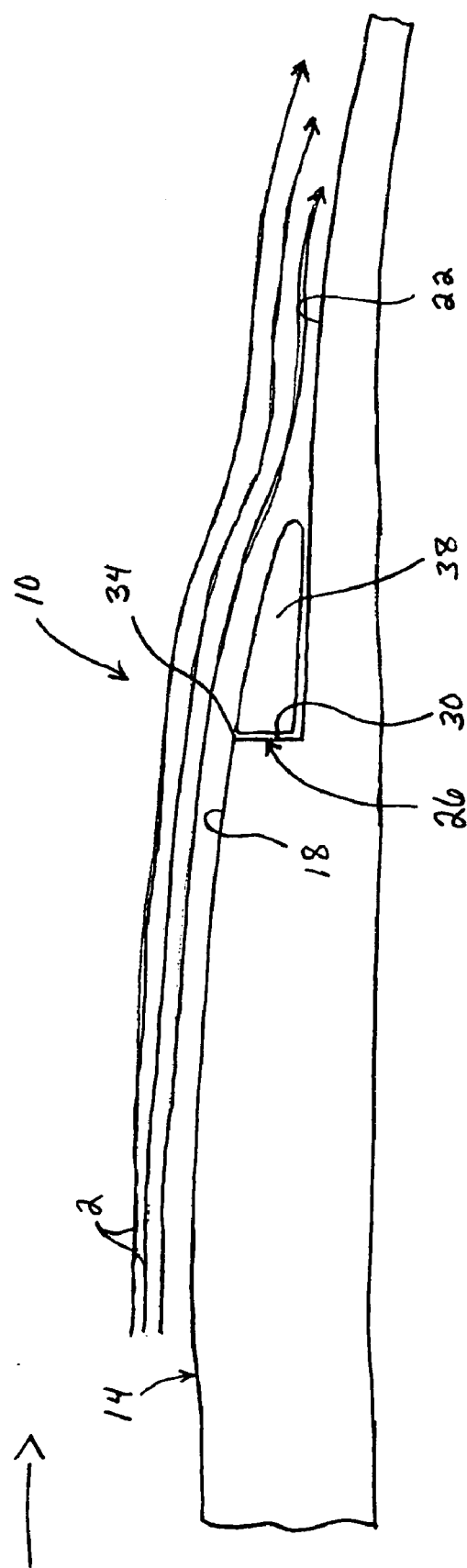
Fig. 2-A

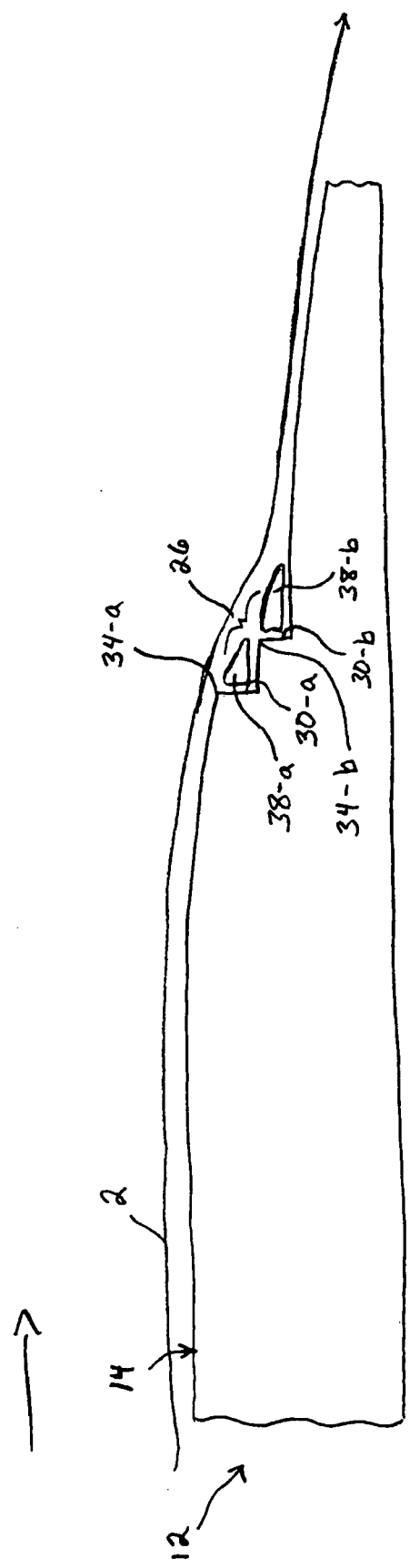
Fig. 2-B

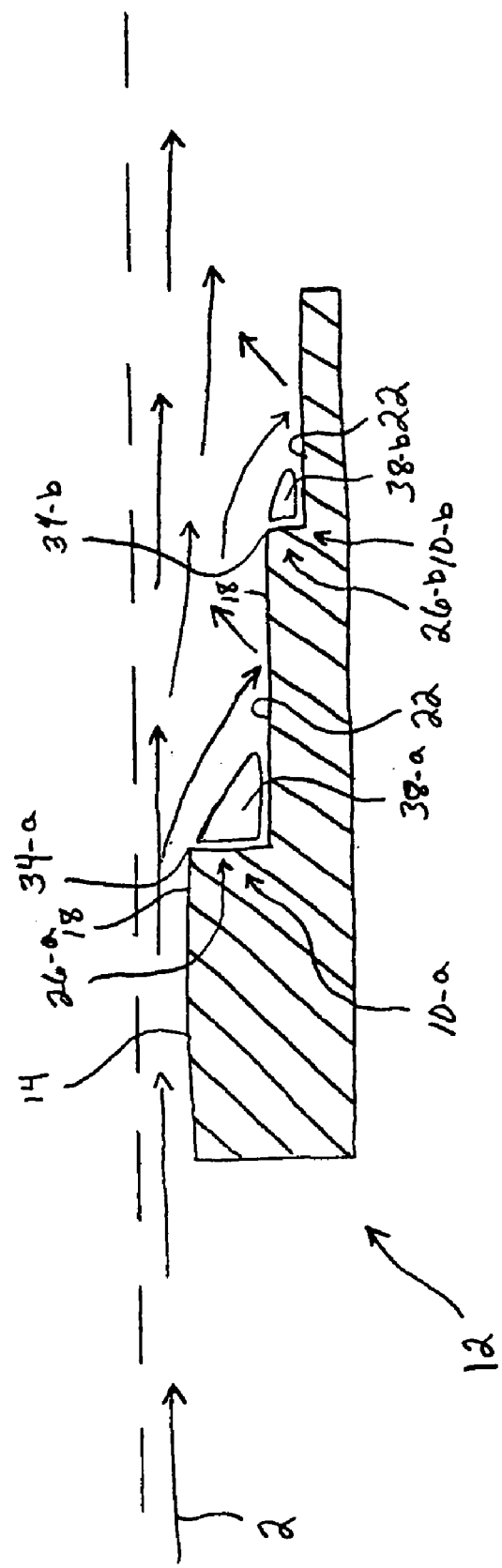
Fig. 2-C

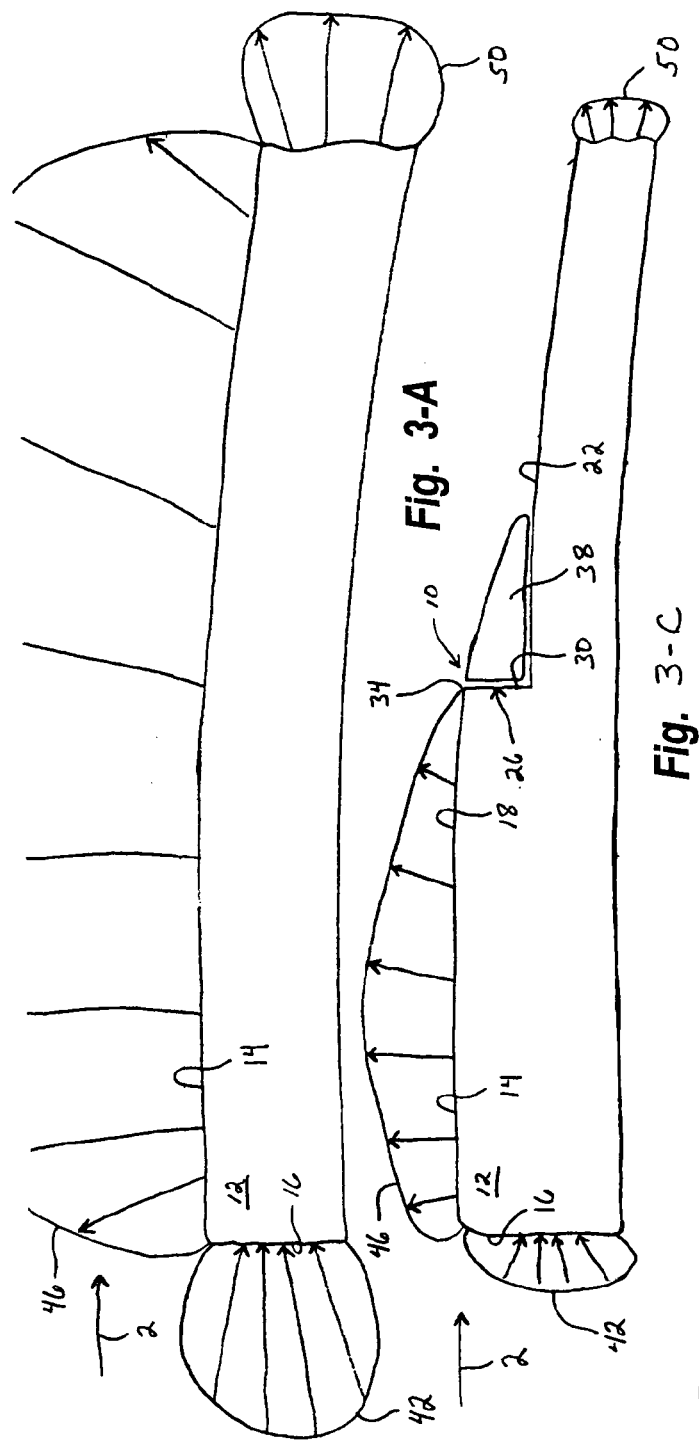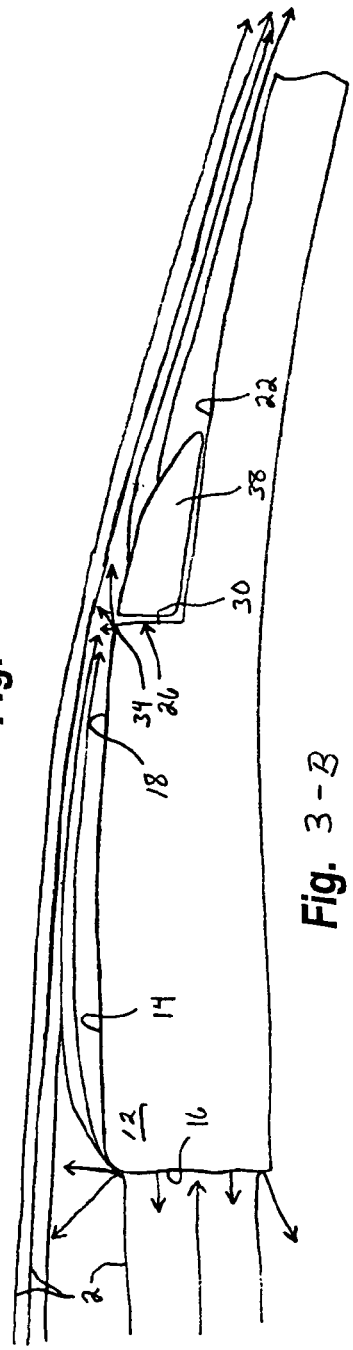
Fig. 3-A
Fig. 3-C
Fig. 3-B

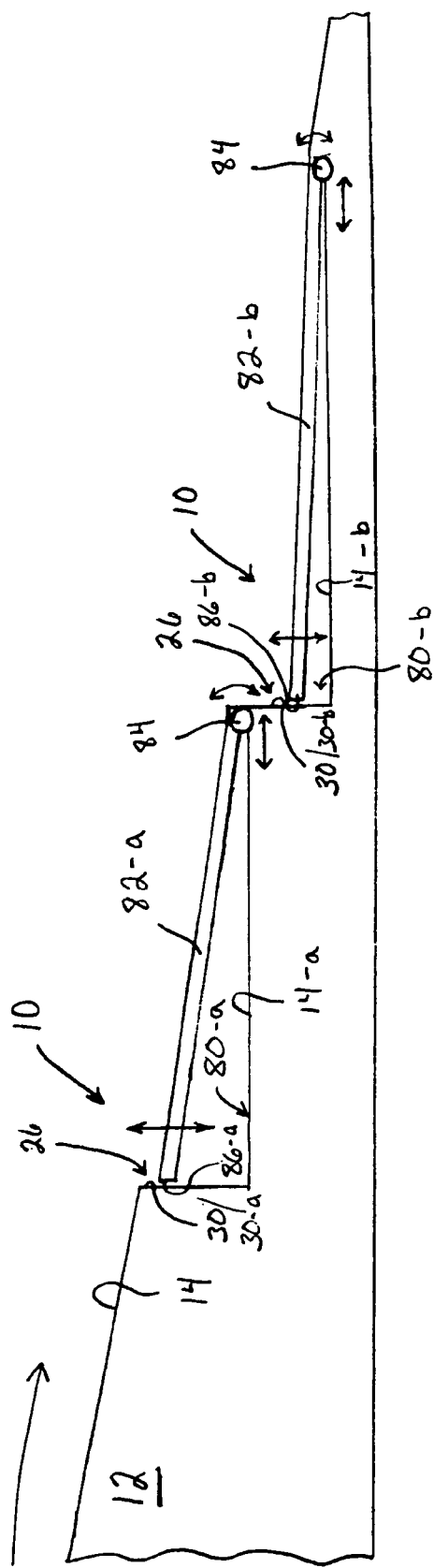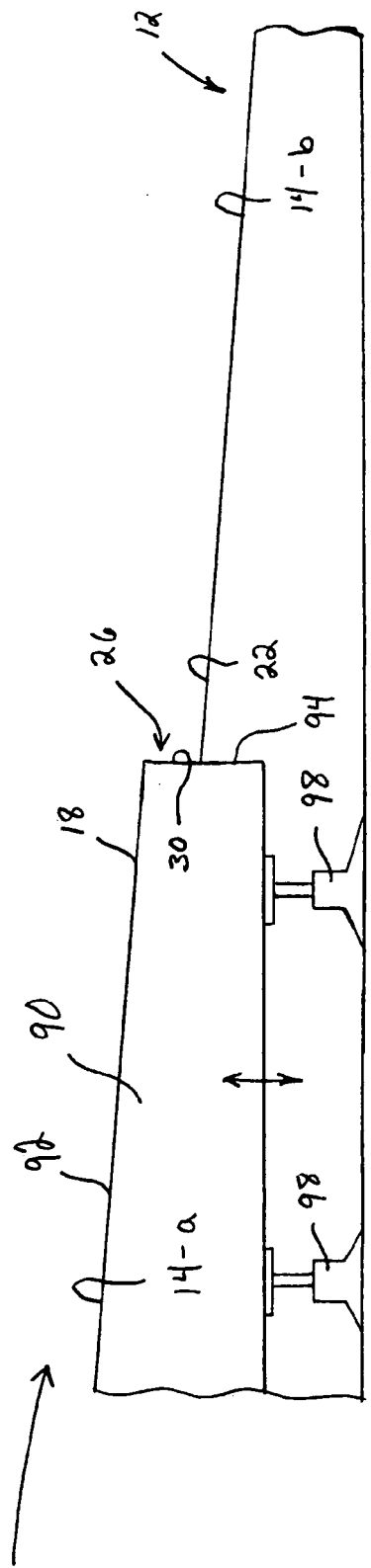
*Fig. 7-A*
*Fig. 7-B*

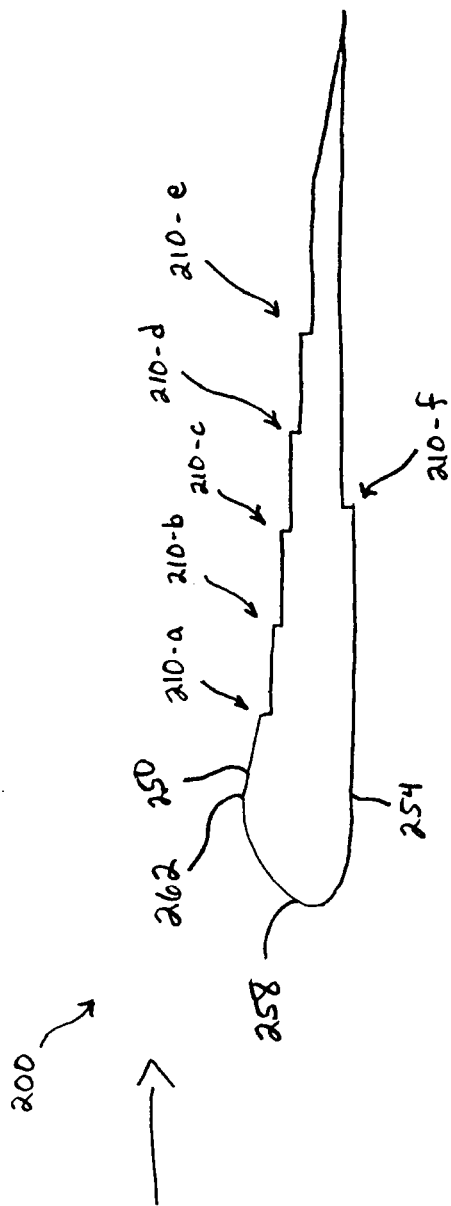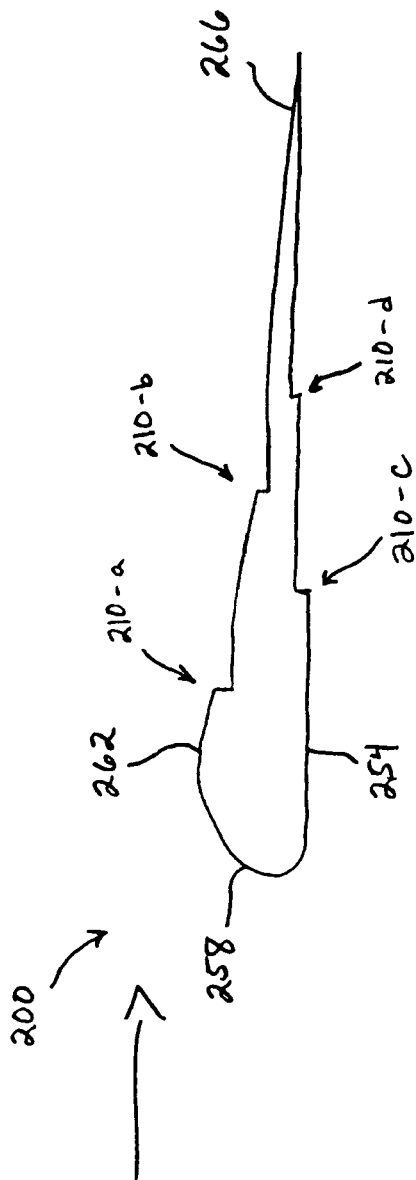
Fig. 9-A
Fig. 9-B

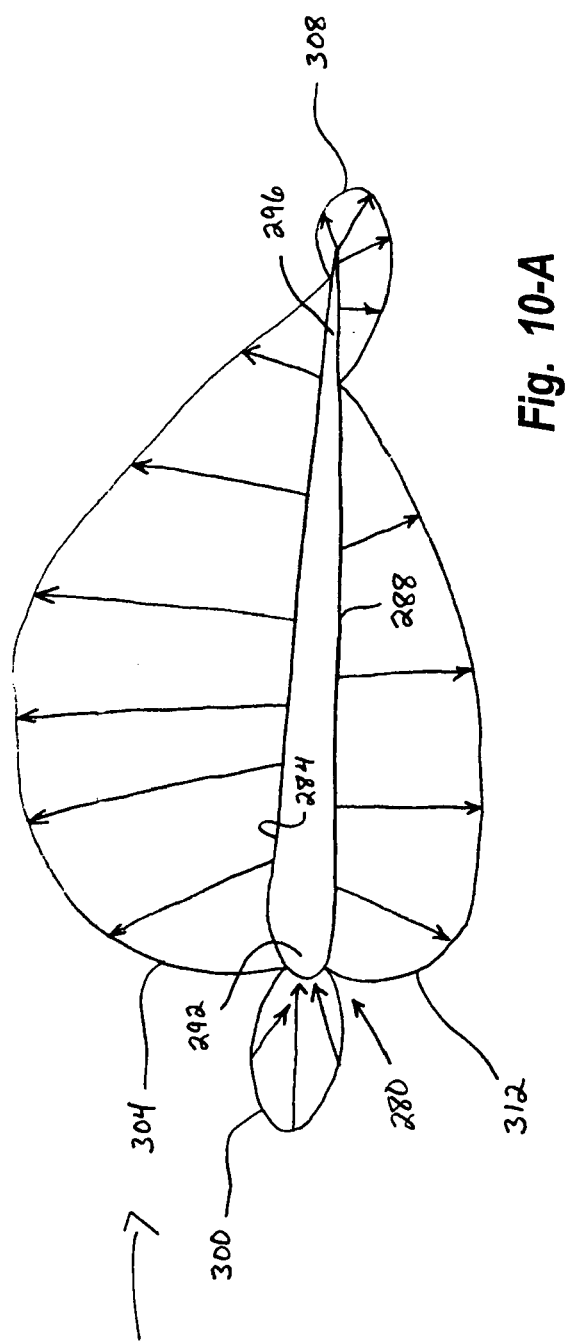
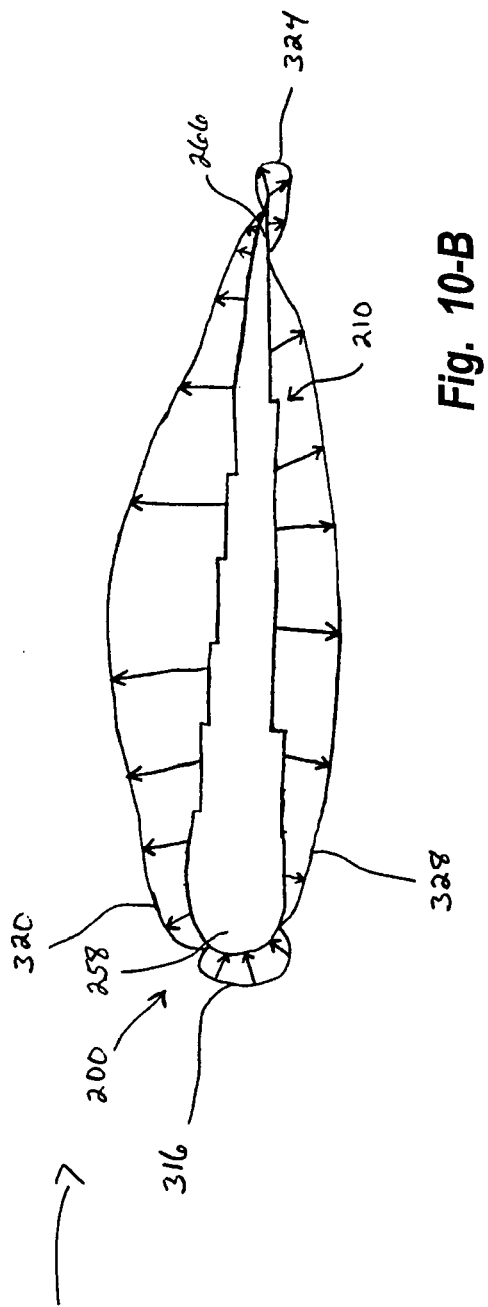
Fig. 10-A
Fig. 10-B

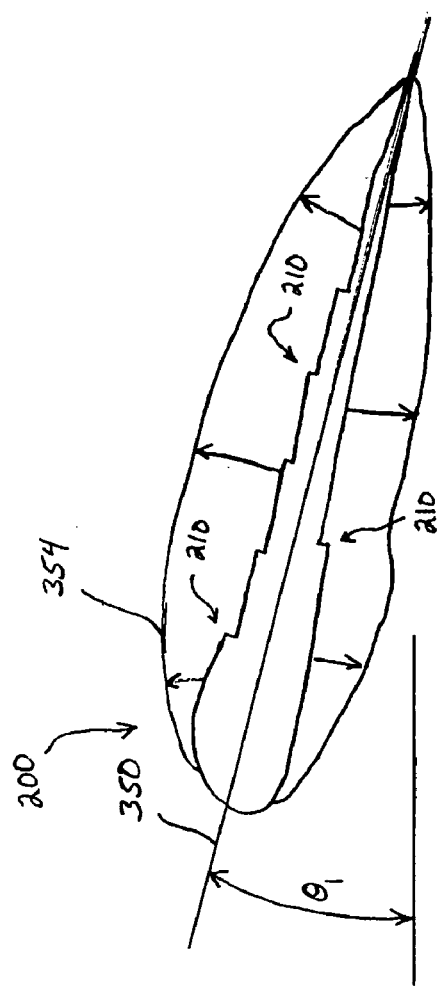
Fig. 11-A
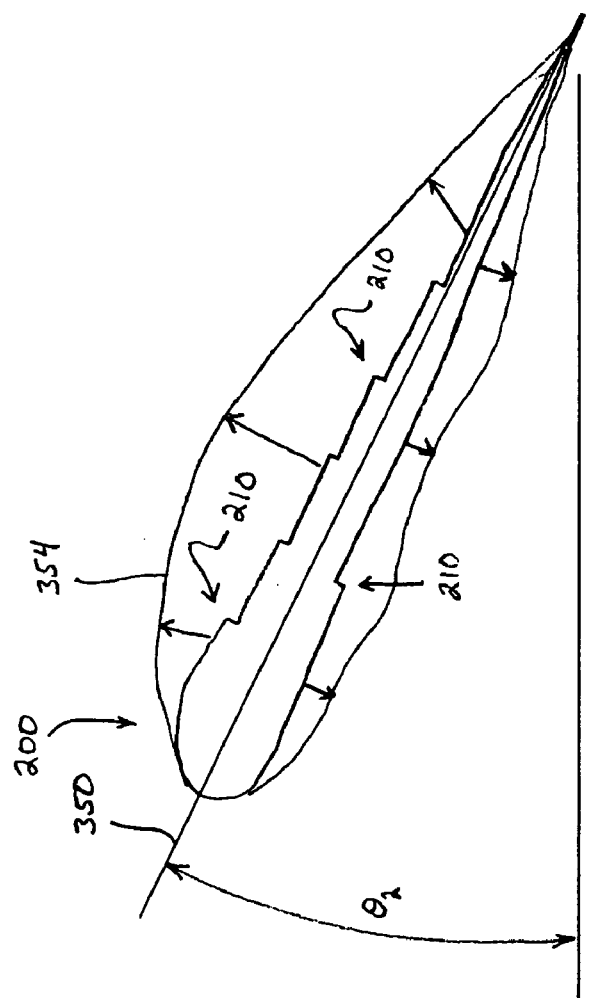
Fig. 11-B

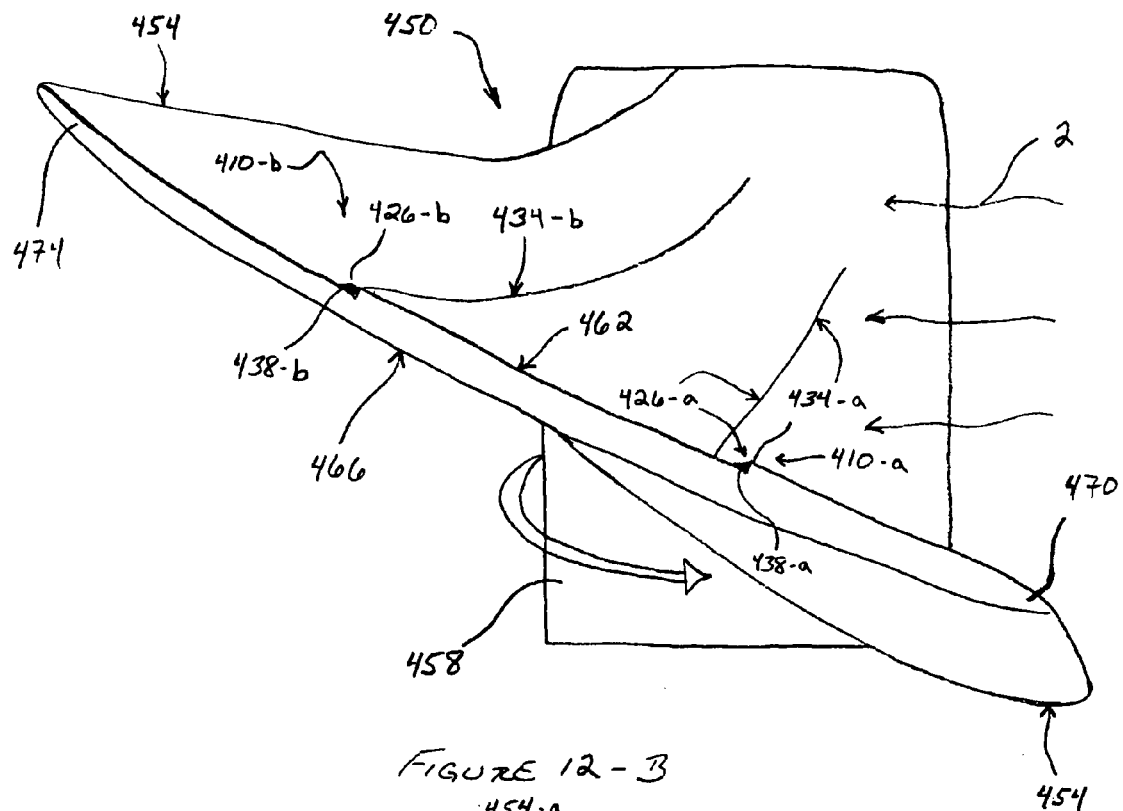
FIGURE 12-B
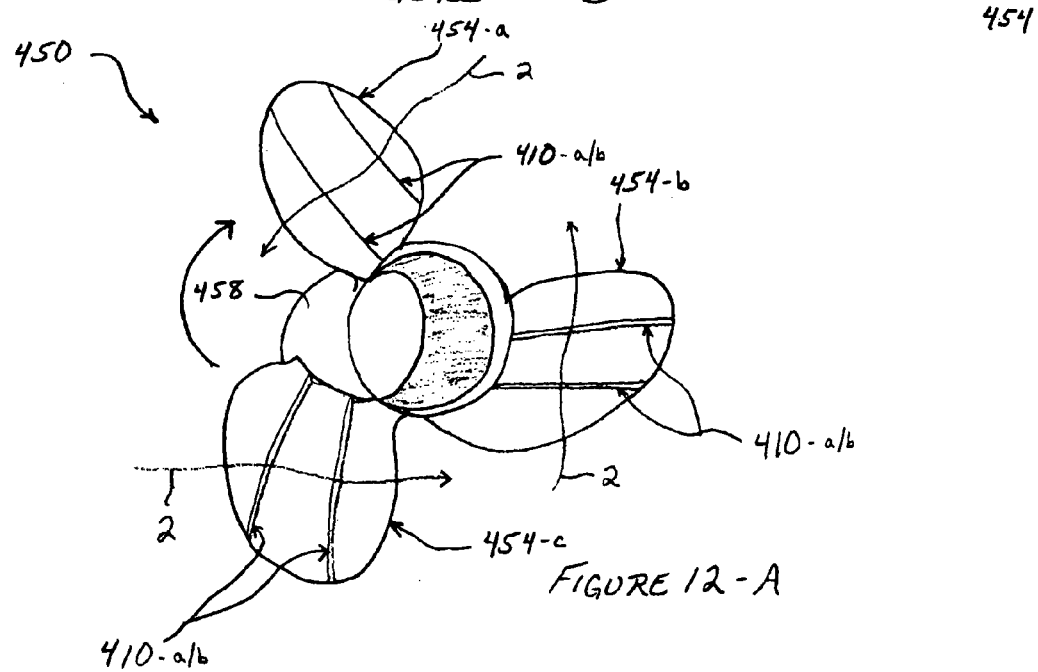
FIGURE 12-A

Figure 13-A

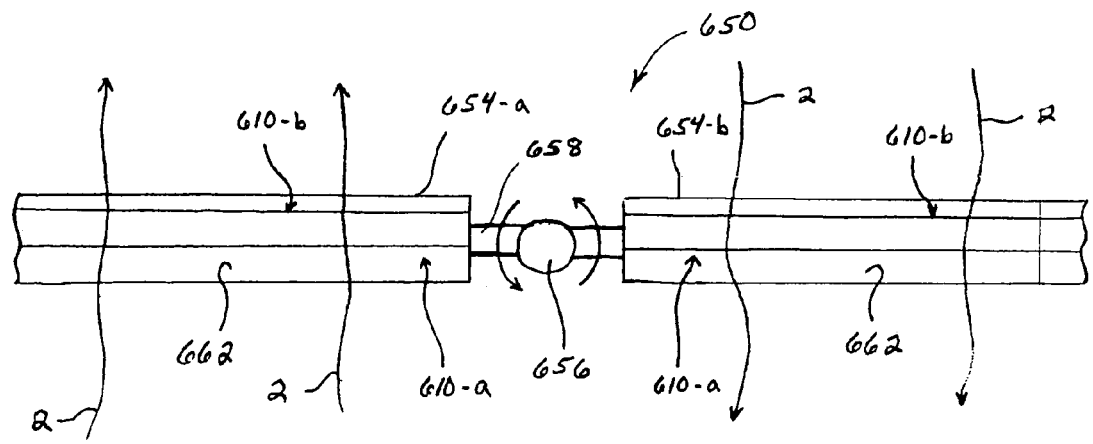
Figure 14-A
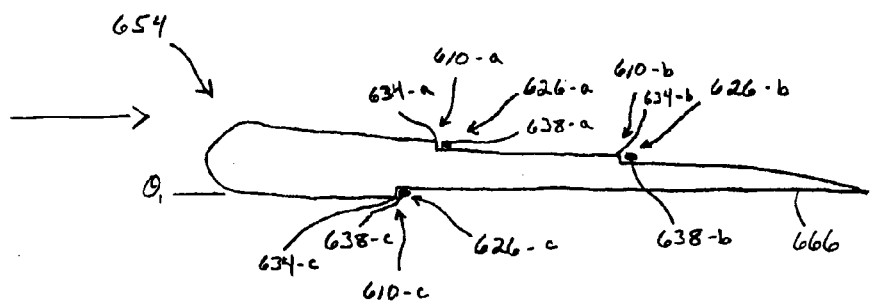
Figure 14-B
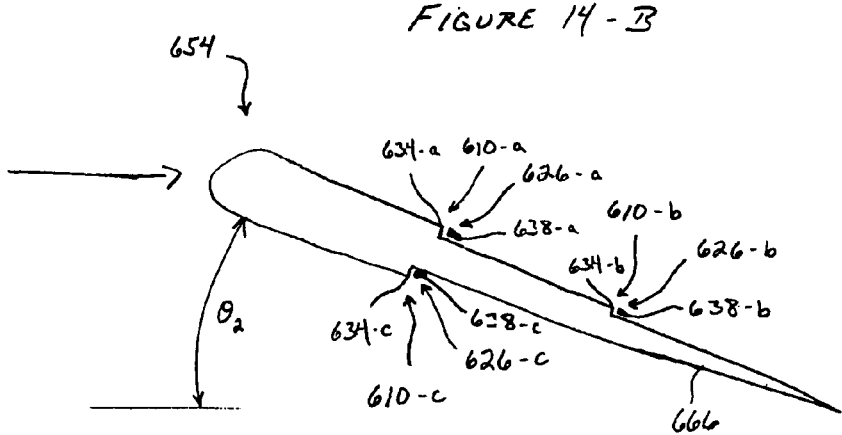
Figure 14-C

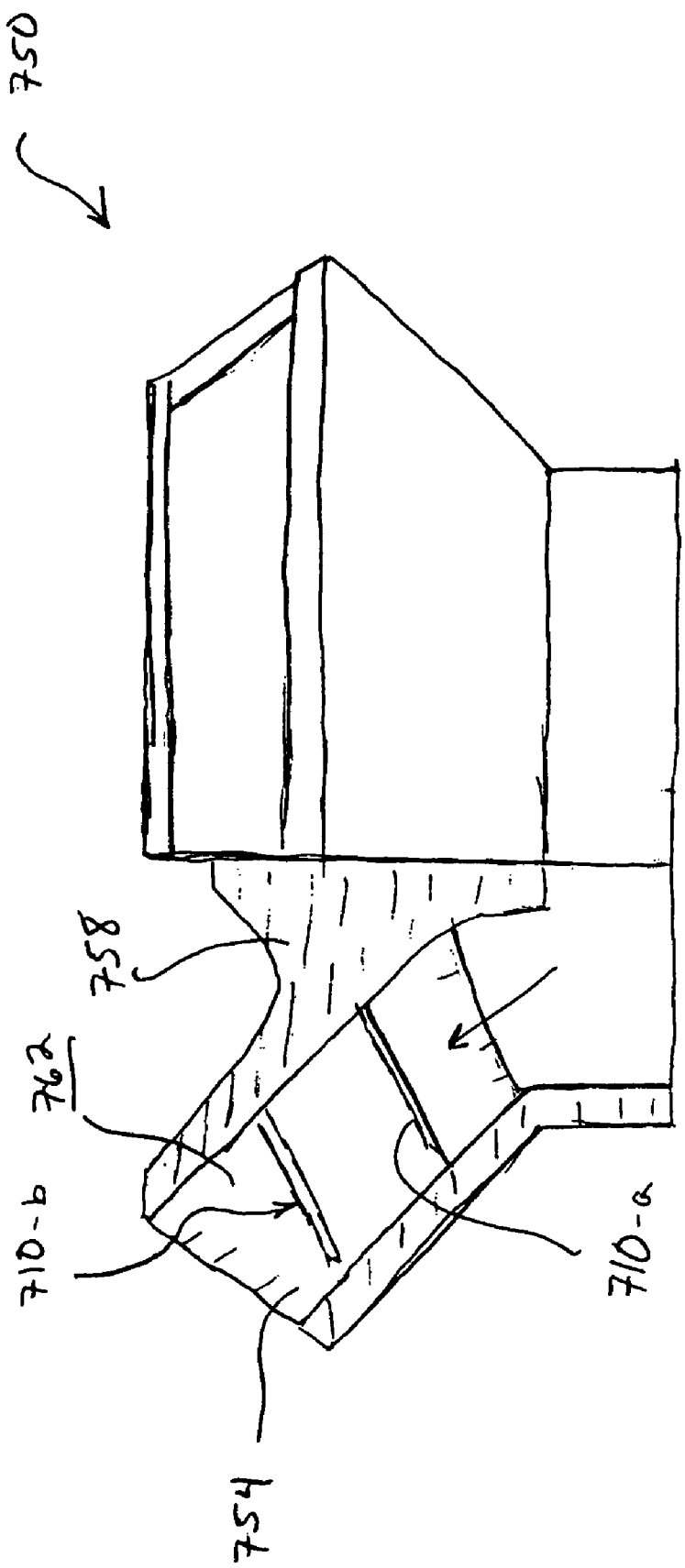

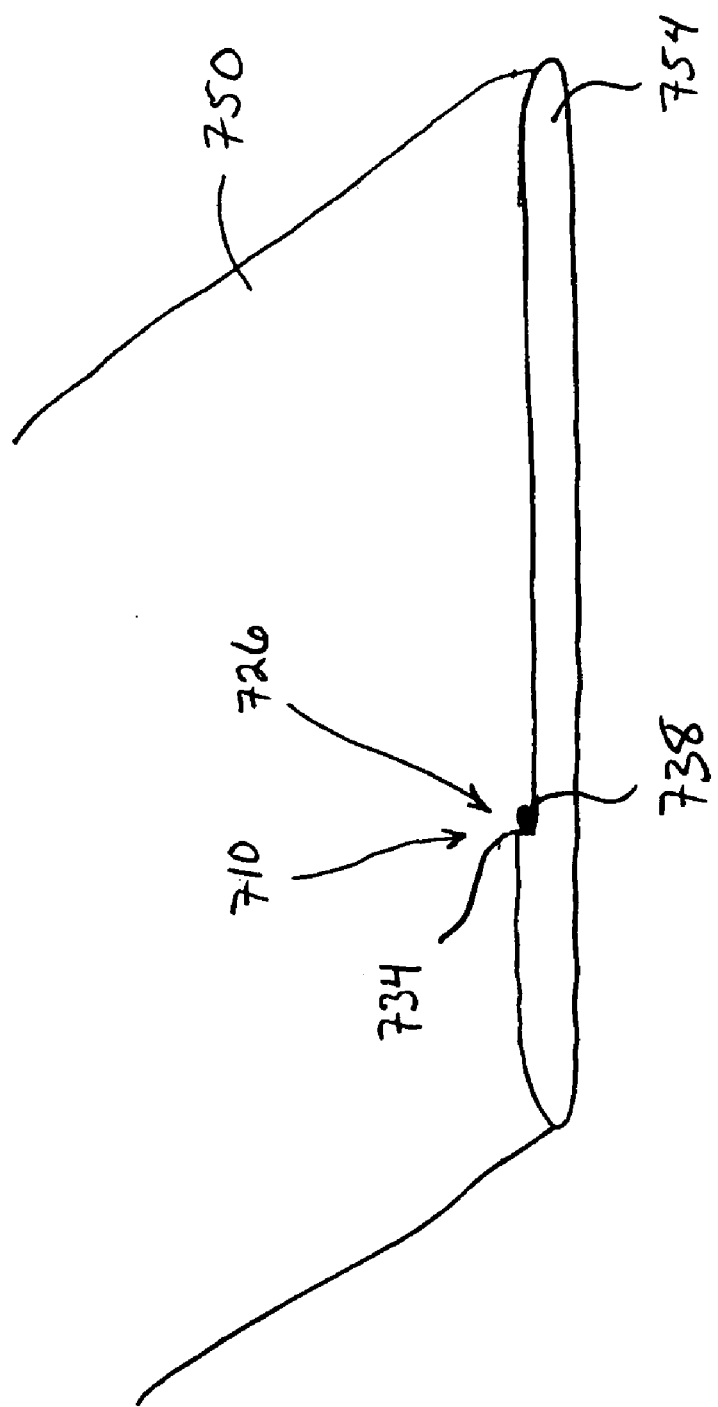
FIGURE 15-B

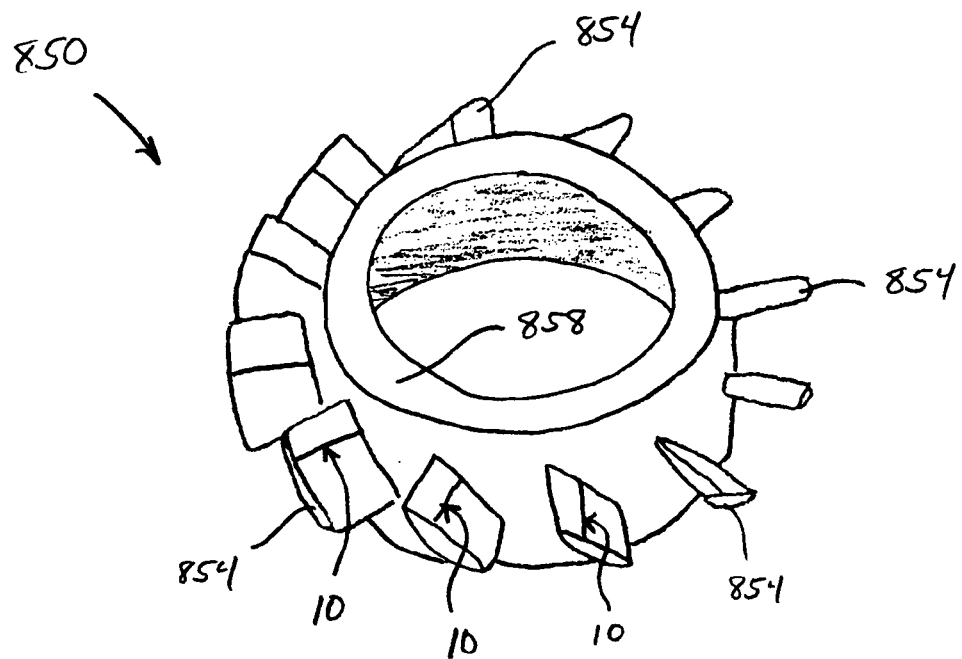
FIGURE 16-A
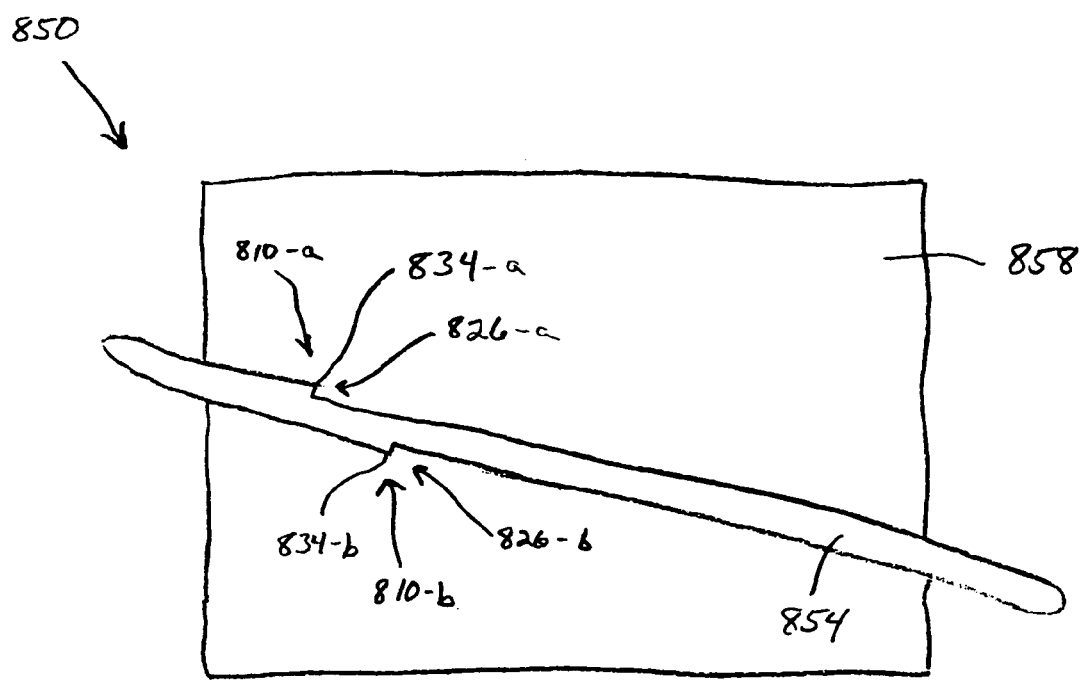
FIGURE 16-B

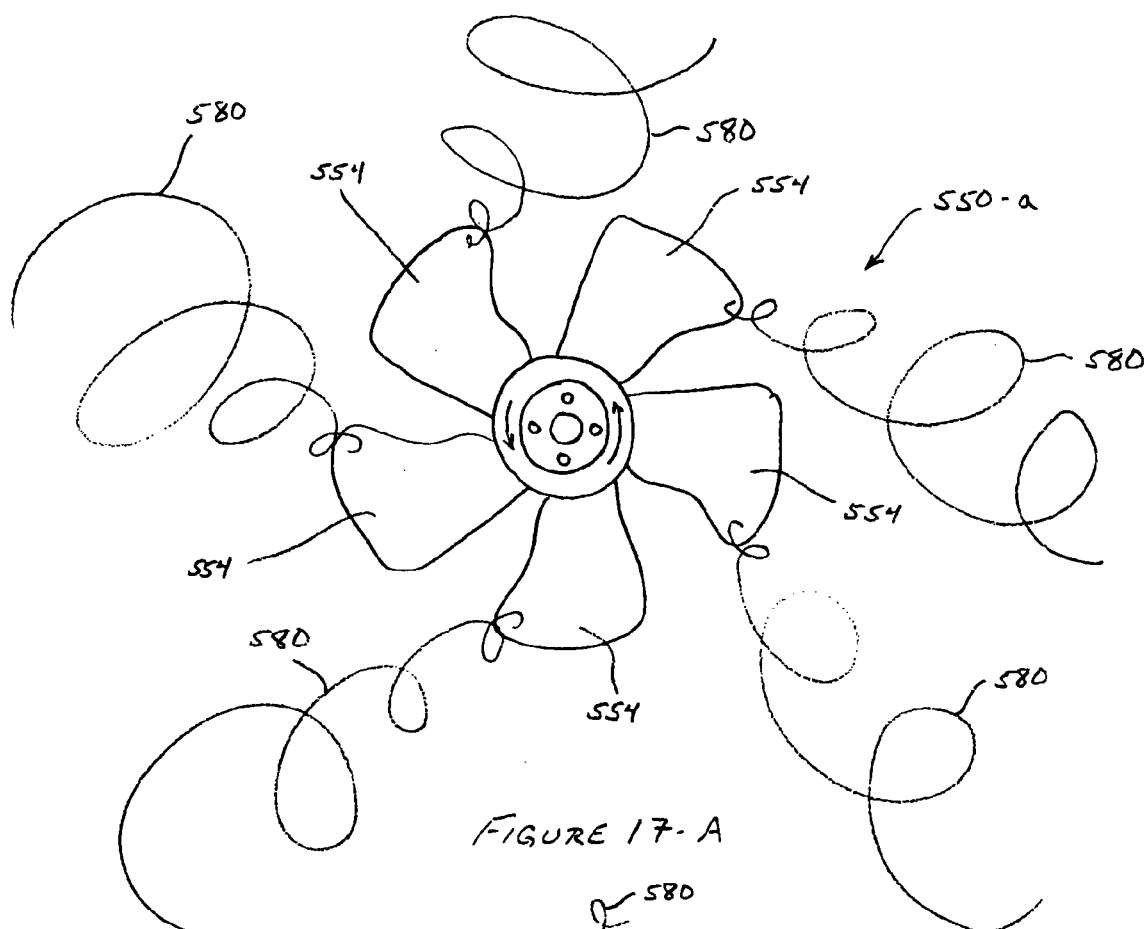
FIGURE 17-A
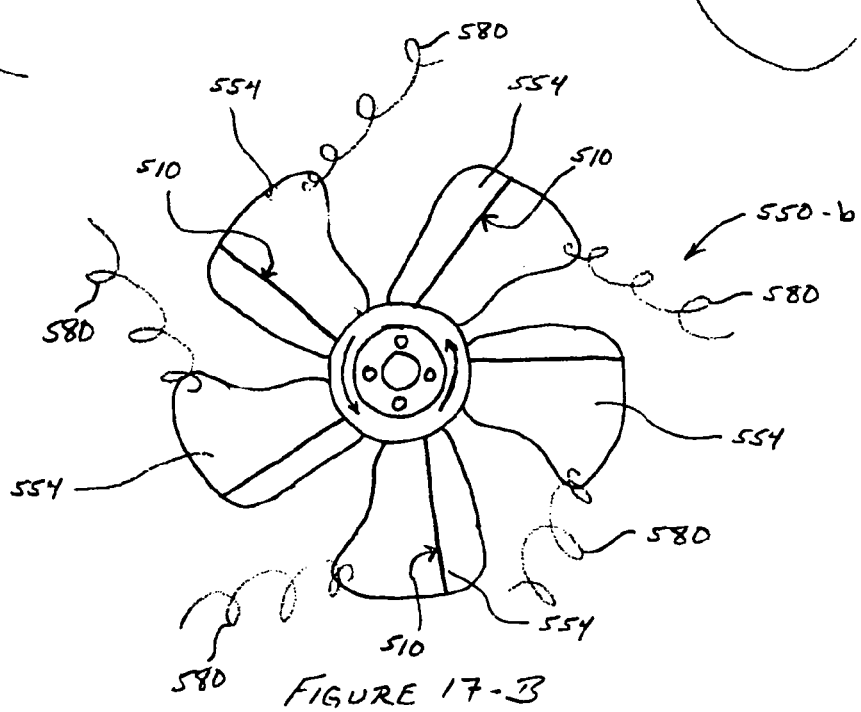
FIGURE 17-B

METHOD AND SYSTEM FOR REGULATING FLUID FLOW OVER AN AIRFOIL OR A HYDROFOIL

RELATED APPLICATIONS

This application claims priority to U.S. Provisional Application Ser. No. 60/390,510, filed Jun. 21, 2002, and entitled, "System and Method for Using Surface Pressure Gradient Regulators to Control and Improve Fluid Flow Over the Surface of an Object," which is incorporated by reference in its entirety herein.

BACKGROUND

1. Field of the Invention

The present invention relates to external fluid flow across a foil, such as an airfoil or hydrofoil, and particularly, to a method and system for influencing and regulating the properties and characteristics of the fluid flow, and thus the fluid flow itself, across the surface of an airfoil or hydrofoil, such as a propeller, a turbine or turbine blade, a fan blade, an impeller, a blower, and others, which, in effect, optimizes the fluid flow, thus increasing the efficiency of the foil, as well as the actual properties and characteristics of the fluid.

2. Background of the Invention and Related Art

As an object moves through a fluid, or as a fluid moves over the surface of an object, the molecules of the fluid near the object become disturbed and begin to move about the object. As the fluid continues to move over the object's surface, those molecules adjacent the surface of the object have the effect of adhering to the surface, thus creating negative forces caused by the collision of these molecules with other molecules moving in the free stream. The magnitude of these forces largely depends on the shape of the object, the velocity of fluid flow with respect to the object, the mass of the object, the viscosity of the fluid, and the compressibility of the fluid. The closer the molecules are to the object, the more collisions they have. This effect creates a thin layer of fluid near the surface in which velocity changes from zero at the surface to the free stream value away from the surface. This is commonly referred to as the boundary layer because it occurs on the boundary of the fluid. The collision of molecules at the surface of an object creates inefficient and unpredictable fluid flow, such as drag, and inevitably turbulence and vortexes.

Most things in nature try to exist within a state of equilibrium. The same is true for fluid flow over the surface of objects found in natural environments. For example, during a wind storm over the dessert, or a snow storm over a field, or even the sand on the beach as the water flows over and over, evidence exists that a state of equilibrium between the fluid flow and the surface over which the fluid is flowing is trying to be reached. As conditions are not perfect and the flow must be less than completely laminar, the surface of these natural conditions forms several sequential ripples or ledges that indicate the fluid and the surface are reaching as close a state of equilibrium as possible. Just like in nature, manufactured conditions and situations are equally not able to reach perfect conditions of fluid flow.

The study of aerodynamics over a surface has been extensive. However, over the years, the prevailing theory or idea has been that smoother or streamlined is better and operates to optimize fluid flow. As such, every conceivable manufactured device or system in which fluid passes over the surface of an object has been formed with the surface being as smooth and streamlined as possible.

The fields of fluid dynamics and aerodynamics study the flow of fluid or gas in a variety of conditions. Traditionally this field has attempted to explain and develop parameters to predict viscous material's behavior using simple gradient modeling. These models have enjoyed only limited success because of the complex nature of flow. Low velocity flow is easily modeled using common and intuitive techniques, but once the flow rate of a fluid or gas increases past a threshold, the flow becomes unpredictable and chaotic, due to turbulence caused by the interaction between the flowing material and the flow vessel. This turbulence causes major reductions in flow rate and efficiency because the flow must overcome a multi-directional forces caused by the turbulent fluid flow.

Attempts to improve flow rate and efficiency, scientists and engineers have traditionally accepted the principle that the smoother the surface the material is passing over, the lower the amount of turbulence. Thus efforts by scientists and engineers to improve flow and efficiency rates have generally focused on minimizing the size of the surface features across which the material is flowing. Because the turbulence is caused by micro-sized surface features, efforts to minimize these them have always been limited by the technology used to access the micro-sized world.

Turbulence occurs at the rigid body/fluid or gas interface also know as the boundary layer. The flowing material behaves predictably i.e. in a laminar fashion, as long as the pressure down flow remains lower than the pressure up flow. Generally as the rate of flow increases the pressure also increases, and the pressure gradient in the boundary layer becomes smaller. After a certain threshold is achieved, the flow closer to the rigid body is much slower than the flow outside the boundary layer, thus the pressure directly in the orthogonal direction from the rigid body is less than the pressure down flow. This causes the kinetic energy of the molecules in the boundary layer to move in the direction of the lowest pressure, or away from the rigid body. This change in the direction of the material, from moving in the direction of flow to moving across the direction of flow in the boundary layer creates vortices within the boundary layer and along the rigid body. These vortices create drag because the direction of flow as well as the kinetic energy of the particles is not in the down flow direction alone, but in a variety of directions. As a result, large amounts of energy are required to overcome the drag force, lowering the flow rate and efficiency.

Developments in the past few decades have improved on the traditional understanding of flow over a rigid body, resulting in advances in mathematical and computer modeling, as well as improved theoretical understanding of a material's behavior under non-ideal circumstances. Most of these advances have focused on improving the flow surface.

One such example of an improved flow surface is to use a rough flow surface that creates myriad miro-vortices much like a shark's skin or sand paper. It is thought that these small turbulence zones inhibit the creation of larger and more drag creating vortices. While these rough materials have been used in advanced racing yacht hulls as well as in swimming suite materials, there is still not a large improvement over smooth surfaces. Thus the state of the art is still struggling to understand turbulent flow beyond specific equations, and applications are still slowed by the drag and inefficiency caused by the turbulent flow.

SUMMARY AND OBJECTS OF THE INVENTION

The present invention seeks to offer a solution to much of the fluid flow problems across the surfaces of the several different types of airfoils and hydrofoils, such as a propeller, a fan blade, a turbine, a rotor, and/or an impeller, as encountered in both controlled and natural environments as discussed above. In its most general theoretical description, the present invention features a fluid flow regulator that functions to significantly influence fluid flow across the surface of an airfoil or hydrofoil. More specifically, the present invention fluid flow regulator functions to significantly regulate the pressure gradients that exist along the surfaces of a foil subject to either liquid or gaseous fluid and its flow. The controlled regulation of pressure gradients is accomplished by reducing the pressure drag at various locations along the surfaces, as well as the pressure drag induced forward and aft of the foils, via a pressure recovery drop. Reducing the pressure drag in turn increases pressure recovery or pressure recovery potential, which pressure recovery subsequently lowers the friction drag along the surfaces. By reducing or lowering friction drag, the potential for fluid separation is decreased, or in other words, attachment potential of the fluid is significantly increased. All of these effects may be appropriately and collectively phrased and referred to herein as optimization of fluid flow, wherein the fluid flow, its properties and characteristics (e.g., separation, boundary layer, laminar vs. turbulent flow), and its relationship to the foil are each optimized, as well as the performance of the foil subject to the fluid flow.

The present invention describes a method and system for controlling the flow of a fluid over the surface of an object to improve the fluid flow by introducing at least one, and perhaps a plurality of, depending upon environmental conditions, fluid flow regulators that serve to regulate pressure, and to reduce the magnitude of molecule collision occurring within the fluid near the surface of the object, thus reducing turbulent flow or increasing laminar flow and reducing fluid separation. This is accomplished by controlling or regulating the pressure at any given area or point on the surface of the object using the fluid flow regulator. Likewise, the pressure may be regulated and fixed at a certain value depending upon the conditions under which the object is operating. Being able to regulate the pressure at any given area or areas on the surface of an object over which fluid may pass will provide for the direct regulation of velocity, density, and viscosity of the fluid as well. Controlling these parameters will allow the flow to be optimized for any conceivable condition or environment.

It is contemplated that the present invention is applicable or pertains to any type of fluid, such as gaseous fluids and liquids. For purposes of discussion, gaseous fluids, namely air, will be the primary focus.

In accordance with the invention as embodied and broadly described herein, the present invention further features a fluid control system and method for controlling the fluid flow over the surface of an object to optimize the flow of the fluid and to reduce its disruptive behavior. The fluid flow control system of the present invention utilizes one or more fluid flow regulators, or pressure gradient regulators, to create a sub-atmospheric barrier or a reduced pressure shield along the surface of an object, wherein the molecules of the boundary layer are unable to sufficiently adhere to the surface and collide with other molecules to create inefficient fluid flow. As such, these molecules flow across or over the surface of the object in a more efficient manner than known standard aerodynamic surfaces.

In a preferred embodiment, the fluid flow control system comprises: a fluid flowing at an identifiable velocity and pressure and having a specific density; an object having an identifiable surface area comprising the object's surface, wherein the fluid flow is introduced to and flows across at least a portion of the object's surface; and at least one fluid flow regulator formed within the object's surface, wherein a surface pressure may be regulated at any point along said surface, and wherein the fluid flow regulator comprises a drop point and a drop face extending from the drop point at a substantially perpendicular angle from the object's surface and existing in the direction of flow of said fluid to create a sub-atmospheric barrier, the fluid flow regulator designed to induce a sub-atmospheric barrier at the pressure gradient regulator on the object's surface, the fluid flow regulator ultimately causing a reduction of turbulence in and an increase in laminar flow of the fluid across the object's surface.

In an alternative embodiment, the fluid control system comprises a fluid flowing at an identifiable velocity and pressure; a first surface existing in a first plane and comprising a surface area, wherein the fluid flows across at least a portion of the first surface; a second surface also comprising a surface area, the second surface existing in a second plane that is offset from the first plane in a substantially parallel relationship, wherein the second surface extends from the first surface in the direction of flow of the fluid; and a fluid flow regulator relating the first surface to the second surface and comprising similar elements as described above, as well as the drop face of the pressure gradient regulator extends from the first surface at a substantially perpendicular angle.

The present invention further features a method for controlling the flow of a fluid over the surface of an object comprising the steps of obtaining an object subject to fluid flow, the object having one or more fluid carrying surfaces over which a fluid passes; and forming one or more fluid flow regulators in the fluid carrying surfaces, wherein the fluid flow regulators comprise similar elements and features as described above.

With proper selection of the design parameters of the one or more fluid flow regulators, the resulting disturbances in the laminar boundary at the surface of an object can be decreased so that boundary layer separation as described above, relative to where the separation would have occurred in the absence of a fluid flow regulator, may be virtually eliminated. The surface pressure gradient allows the pressure at any area on a surface to be regulated with the goal of achieving less turbulent and more laminar fluid flow across and leaving the surface of the object. In essence, the fluid flow regulators accomplish in a manufactured and controlled setting what nature is trying to do in natural environments—achieve the greatest state of equalization or harmony between the fluid flow and the surface of the object over which the fluid passes.

The present invention is applicable to any airfoil, hydrofoil, or rotating body system subject to fluid flow. In several preferred and exemplary embodiments, the present invention comprises or features one or more fluid flow regulators featured within an airfoil, a hydrofoil, a propeller, an impeller, a fan, a turbine, a rotary system, and others, wherein the fluid flow regulator is positioned preferably about one or more surfaces subject to fluid flow.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 2-A illustrates a side cross-sectional view of an object having a surface and one or more fluid flow regulators therein;

FIG. 2-B illustrates a side cross-sectional view of an object having a surface and one or more fluid flow regulators therein, wherein said fluid flow regulator comprises a pressure recovery drop having a plurality of drop faces;

FIG. 2-C illustrates the touch and go phenomenon created by the present invention fluid flow regulators;

FIG. 3-B illustrates a side cross-sectional view of an object having a surface and one or more fluid flow regulators therein, as well as the pressure gradients or pressure drag existing along the surface;

FIG. 3-C illustrates a side cross-sectional view of an object having a surface and one or more fluid flow regulators therein, as well as the flow of fluid over the surface and the generated sub-atmospheric barrier;

FIG. 7-A illustrates a side cross-sectional view of one exemplary embodiment of a plurality of dynamic fluid flow regulators showing how the fluid flow regulators may be adjustable to accommodate varying conditions or fluid behavior across the surface of an object;

FIG. 7-B illustrates a side cross-sectional view of another exemplary embodiment of a plurality of dynamic fluid flow regulators showing how the fluid flow regulators may be adjustable to accommodate varying conditions or fluid behavior across the surface of an object;

FIG. 9-A illustrates a side cross-sectional view of an airplane wing having a plurality of fluid flow regulators along its upper and lower surfaces arranged in one exemplary pattern;

FIG. 9-B illustrates a side cross-sectional view of an airplane wing having a plurality of fluid flow regulators along its upper and lower surfaces arranged in another exemplary pattern;

FIG. 10-A illustrates a side cross-sectional view of a streamlined wing and the pressure gradients or pressure drag existing along the upper and lower surfaces of the wing;

FIG. 10-B illustrates a side cross-sectional view of a wing having a plurality of fluid flow regulators arranged in an exemplary pattern, as well as the effect these fluid flow regulators have on the pressure gradients and pressure drag existing on the upper and lower surfaces of the wing;

FIG. 11-A illustrates a side cross-sectional view of a wing having a plurality of fluid flow regulators incorporated therein, wherein the wing is at an identified angle of attack showing the magnitude of the pressure gradients or pressure drag on the wing at that particular angle;

FIG. 11-B illustrates a side cross-sectional view of a wing having a plurality of fluid flow regulators incorporated therein, wherein the wing is at a different identified angle of attack showing and comparing the magnitude of the pressure gradients or pressure drag on the wing at that particular angle;

FIG. 12-A illustrates an isometric view of a boat or ship propeller comprising or featuring a plurality of fluid flow regulators according to one exemplary embodiment of the present invention;

FIG. 12-B illustrates a side view of the boat or ship propeller of FIG. 12-A, as well as a cross-section of one blade of the propeller, wherein the blade comprises or features a plurality of fluid flow regulators according to one exemplary embodiment of the present invention;

FIG. 13-B illustrates a side view of the fan of FIG. 12-A, as well as a cross-section of one blade of the fan, wherein the blade comprises or features a plurality of fluid flow regulators according to one exemplary embodiment of the present invention;

FIG. 14-A illustrates top view of a rotor system comprising or featuring a plurality of fluid flow regulators according to one exemplary embodiment of the present invention;

FIG. 14-B illustrates a cross-sectional side view of one rotor blade of the rotor system shown in FIG. 14-A comprising or featuring a plurality of fluid flow regulators according to one exemplary embodiment of the present invention;

FIG. 14-C illustrates a cross-sectional side view of the rotor blade shown in FIG. 14-B, wherein the rotor blade is at an increased angle of attack and comprises or features a plurality of fluid flow regulators according to one exemplary embodiment of the present invention;

FIG. 15-A illustrates an isometric view of an impeller comprising or featuring a plurality of fluid flow regulators according to one exemplary embodiment of the present invention;

FIG. 15-B illustrates a side view of the impeller of FIG. 12-A, as well as a cross-section of one blade of the impeller, wherein the blade comprises or features a plurality of fluid flow regulators according to one exemplary embodiment of the present invention;

FIG. 16-A illustrates an isometric view of a turbine comprising or featuring a plurality of fluid flow regulators according to one exemplary embodiment of the present invention;

FIG. 16-B illustrates a side view of the turbine of FIG. 12-A, as well as a cross-section of one blade of the turbine, wherein the blade comprises or features a plurality of fluid flow regulators according to one exemplary embodiment of the present invention;

FIG. 17-A illustrates a front view of a fan having streamlined fan blades that produce large and turbulent tip vortices, as shown; and FIG. 17-B illustrates the fan of FIG. 17-A modified to feature a plurality of fluid flow regulators on each of the fan blades, wherein the fluid flow regulators function to significantly reduce the tip vortices generated or produced or induced by the fan.

DETAILED DESCRIPTION OF THE PREFERRED EMBODIMENTS

Figure 1:
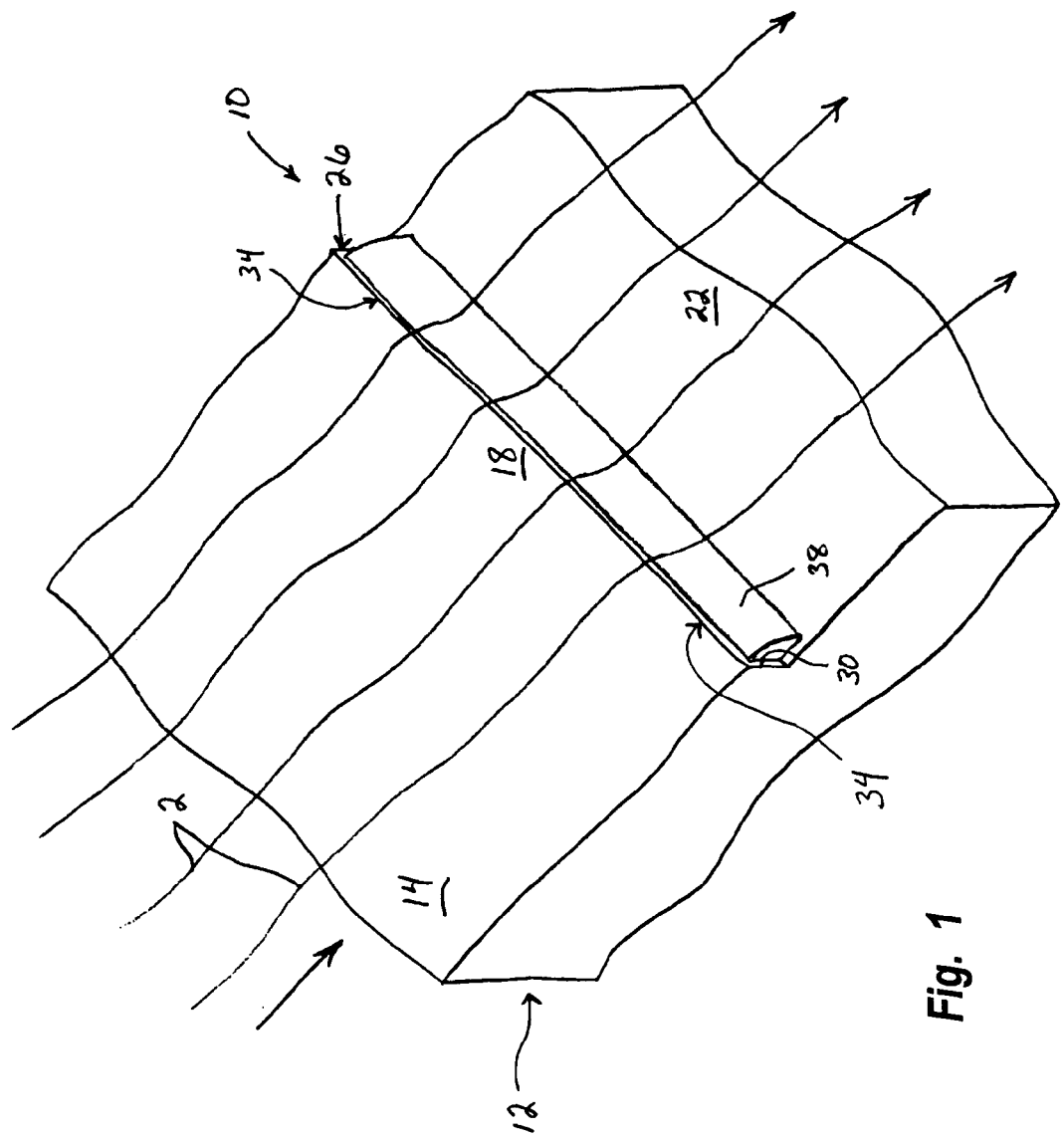
FIG. 1 illustrates an isometric cross-section of an object having a surface and one or more fluid flow regulators therein.

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 17-B, is not intended to limit the scope of the invention, as claimed, but is merely representative of the presently preferred embodiments of the invention. The presently preferred embodiments of the invention will be best understood by reference to the Figures, wherein like parts are designated by like numerals throughout.

The following more detailed description will be divided into several sections for greater clarity and ease of discussion. Specifically, the following more detailed description is divided into three sections. The first section pertains to and sets forth a general discussion on improving and regulating external fluid flow over any object surface using the present invention systems and methods presented herein. The second section pertains to and sets forth a specific description of airfoils featuring the fluid flow regulating system and method of the present invention as set forth herein, along with several examples that detail the procedure of various airfoil tests or experiments conducted and the results of these tests. The third section pertains to and sets forth a specific description of hydrofoils employing the fluid flow regulating system and method of the present invention as set forth herein. Finally, the fourth section provides a description of foils found in rotary devices, such as fans, propellers, turbines, etc. These sections and the descriptions and embodiments within these sections, are not to be construed as limiting in any way, but are provided for the ease and convenience of the reader.

Influencing, Regulating, and Improving Fluid Flow Over any Object's Surface

The present invention seeks to provide new insight into the complex nature of fluid flow over an object's surface, and particularly external fluid flow, such as air or liquid fluid flow. Specifically, the present invention seeks to provide a shifting or altering of the current conceptual understanding of fluid flow over a surface by presenting various methods and systems that significantly improve, influence, and regulate fluid flow over the surface of an object, namely in terms of the mechanics, behavior, and characteristics of the fluid flow. Stated differently, the concepts underlying the systems and methods of the present invention, as well as the systems and methods themselves, as set forth herein, denote and suggest a profound paradigm shift from traditional and current thinking and concepts pertaining to fluid flow over an object's surface, and particularly pertaining to the common conception that streamlined or smooth surfaces are the best way to achieve optimal fluid flow and peak performance of the object or body in the flow. Having said this, although significantly altering current thinking, the present invention seeks to further the understanding of fluid flow and is designed to be utilized in conjunction with several of the technological developments and concepts relating to fluid flow that have developed over the years. As such, it is contemplated that the present invention will both frustrate and augment or supplement current fluid flow concepts and technology, depending upon their applicability to the present invention technology.

As discussed above, the study of fluid flow over the last several decades has been immense, with new ideas and technologies developing at a rapid pace. However, as also discussed above, one core fundamental concept regarding fluid flow over an object's surface, upon which mass of studies and development of technology has been based, has always been assumed—that a smooth or streamlined surface is the best possible surface for achieving optimal fluid flow. However, as is shown herein, it is believed that this core fundamental concept is somewhat flawed, and that it is upon this basis that the present invention seeks to offer or presents a paradigm shift in the complex field of external fluid mechanics. Simply stated, the present invention will allow the design of objects, bodies, devices, and systems otherwise thought to be optimal to be improved upon.

Typically, an object that is moving through a fluid or that has a fluid passing over it experiences different types of aerodynamic forces. As the fluid flows over the object, the molecules in the fluid are disturbed and try to move around the object so that they can equalize themselves once again. Aerodynamic forces and their magnitude are dependent upon several factors, as discussed herein. However, two very important factors are the viscosity of the fluid and the compressibility of the fluid. In regards to viscosity, as fluid passes over the surface of an object a boundary layer is created. This boundary layer acts as a molecular barrier of fluid particles between the free flowing fluid and the object surface. The boundary layer may separate from the surface and may also contribute to the drag forces on the object.

Drag forces manifest themselves in the form of pressure drag forces (pressure drag) and friction drag forces (friction drag), which are both related to one another. Friction drag results from the friction between the molecules in the fluid and the molecules in the surface as the fluid passes over the surface. Pressure drag is generated by the eddying motions that are created in the fluid by the passage of the fluid over the object. Pressure drag is less sensitive to the Reynolds number of the fluid than friction drag. Although both pressure and friction drag are directly related to the viscosity of the fluid, it is useful to define each of these and their characteristics because they each are the result of different flow phenomena. Frictional drag is more of a factor during attached flow where there is little or no separation and it is related to the surface area exposed to the fluid flow. Pressure drag is an important factor when discussing and analyzing separation and its starting points and is related to the cross-sectional area of the object.

The compressibility of the fluid is also important. As fluid passes over the surface of an object, the molecules in the fluid move around the object. If the fluid is dense, such as water, the density will remain constant, even at higher velocities. If the fluid is not as dense, such as with air, the density will not remain constant (except at low speeds— typically less than 200 mph). Instead, the fluid will become compressed, thus changing the density of the fluid. As the density changes, the forces induced upon the object by the fluid will also change. This is even more true at higher velocities.

In its broadest implication, or in its highest level of abstraction, the present invention describes a method and system for influencing and regulating fluid flow, namely its properties or characteristics and behavior, over an object's surface, wherein the system comprises one or more fluid flow regulators strategically designed and positioned along the surface of the object. The method comprises introducing or incorporating or featuring one or more fluid flow regulators onto/into/with the object's surface, by creating a surface featuring a fluid flow regulator, or altering an existing surface to comprise one or more fluid flow regulators. In a preferred embodiment, the fluid flow regulator comprises a Dargan™ fluid flow regulator having a Dargan™ drop, that induces or generates a Dargan™ barrier, which technology is designed and owned by Velocity Systems, Ltd. of Salt Lake City, Utah 84111.

With reference to FIGS. 1 and 2, shown is an isometric view and a side view, respectively, of a segment of an object 12 having a surface 14 thereon. Incorporated into surface 14 is a fluid flow regulator 10 designed to both influence, control, and regulate the flow of fluid 2 (indicated by the direction arrow in each of the Figures herein) over surface 14 of object 12. Structurally, fluid flow regulator 10 comprises a leading edge 18, a trailing edge 22, and a pressure recovery drop 26 strategically placed at an optimal pressure recovery point 34, so as to induce or create a sub-atmospheric barrier 38 at its base. Pressure recovery drop 26 comprises one or more drop faces 30 therein.

Leading edge 18 is an area of surface or surface area existing on surface 14 that leads into a pressure recovery drop 26, or a Dargan drop, that is positioned as close to an optimal pressure recovery point 34, as possible, defined below. As such, depending upon different conditions and situations, there may be one or a plurality of optimal pressure recovery points along one particular surface, thus calling for one or a plurality of fluid flow regulators 10 (see FIG. 4). It could also be said that leading edge 18 is a surface area that extends outward in a rearward direction from the top of drop face 30 of pressure recovery drop 26 an identified distance, or that leading edge 18 is a surface area that precedes pressure recovery drop 26, each with respect to the direction of fluid flow. Leading edge 18 may be of any size and shape as desired or called for as dictated by design parameters. However, it should be noted that leading edge 18 must be of sufficient length to receive fluid flow 2 thereon, or contribute to the flow of fluid on surface 14.

Pressure recovery drop 26 is part of or is an extension of surface 14 and leading edge 18. Structurally, pressure recovery drop 26 is preferably orthogonal and comprises a surface area or drop face 30 that is perpendicular or substantially perpendicular to leading edge 18, and preferably ninety degrees 90° perpendicular. Pressure recovery drop 26 extends perpendicularly in a downward direction from leading edge 18 so that it comprises an identified and pre-determined height. In other words, pressure recovery drop extends between leading edge 18 and trailing edge 22 and exists or is postured in a sub-fluid arrangement, such that the fluid 2 will always encounter pressure drop 26 from leading edge 18 and fall off of drop face 30. This is true no matter how surface 14 is oriented (e.g., horizontal, vertical, on an angle, etc.). Fluid flow in the opposite direction so that it flows up pressure recovery drop 26 is not intended and is contrary to the present invention.

Pressure recovery drop 26 is positioned at or as precisely proximate an optimal pressure recovery point 34 as possible, the reason being explained in detail below. The distance that pressure recovery drop 26 extends from leading edge 18, or the height of drop face 30 is critical. The greater the height, the greater the pressure drop and the more pressure drag is reduced, which leads to an increase in pressure recovery at the surface and greater reduction in friction drag. All of this functions to increase the fluid attachment potential, or stated another way, reduce the separation potential of the fluid. Conversely, the shorter the height of drop face 30, the less pressure drag is reduced. The less pressure drag is reduced, the less pressure recovery there will be at the surface, which subsequently leads to less fluid attachment potential. Therefore, the height of drop face 30 is specifically calculated for every fluid flow situation that an object might encounter, which drop face height is pre-determined prior to or during fluid flow. The calculation of the height of drop face 30 is based upon several design, fluid, and other physical factors, as well as on several environmental conditions. Some of these factors or conditions include the particular type of fluid flowing over the object's surface, the velocity of fluid, the viscosity of fluid, the temperature of fluid, the direction of the flow of the fluid, the type and texture of the surface, the geometric area of the object's surface both before and after the pressure recovery drop, the magnitude or range of pressure existing on object's surface, the orientation of the object within or with respect to the fluid, and any others. For example, the height of drop face 30 may not need to be as high if the surface is a prop or boat hull traveling through water because the pressure recovery will be quick. On the other hand, for similar flow properties and/or characteristics of an object flowing through air, the height of drop face 30 may be much greater to achieve the same optimal flow characteristics as the pressure recovery will be slower as compared to the pressure recovery along an object's surface in water. Thus, from this it can be seen that drop face 30 is, among other things, very density dependent. Pressure recovery drop 26 may also be variable in that it's height may be adjustable to account for changing or varying factors/conditions. This is especially advantageous because external flow exists, for the most part, within an uncontrolled environment where the properties and characteristics of the fluid are volatile and may change or vary in response to changing conditions or other influencing factors, such as the presence, speed, size, and shape of an object.

Trailing edge 22 is similar in structure to leading edge 18, only instead of preceding pressure recovery drop 26, trailing edge 22 follows pressure recovery drop 26 with respect to the direction of fluid flow so that fluid flow 2 passes over leading edge 18, then pressure recovery drop 26, and then finally trailing edge 22. Trailing edge 22 extends outward in a forward direction from pressure recovery drop 26, and particularly from the bottom of drop face 30. Just like leading edge 18, trailing extends an identified distance and provides a trailing flow boundary for said fluid. Both leading edge 18 and trailing edge 22 are defined in relation to the direction of fluid flow (represented by the arrows).

In the embodiment shown in FIGS. 1 and 2, leading edge 18 and trailing edge 22 are integrally formed with surface 14 so that they are actually part of surface 14. Other embodiments, shown and described below, are presented herein where leading edge and/or trailing edge are not integrally formed with surface 14. moreover, FIGS. 1 and 2 illustrate only a single fluid flow regulator 10, wherein the present invention contemplates the use of one or a plurality of such regulators along a single surface, depending upon several factors, including design requirements of the object, fluid flow, fluid type, environmental factors, and any others relating to fluid flow over a surface.

As stated above, the present invention recognizes what may be termed as an optimal pressure recovery point 34. Optimal pressure recovery point 34 is defined herein as the point(s) or location(s) about surface 14 at which there is an imbalanced or unequal pressure gradient forward and aft of fluid 2, thus creating adverse pressure within internal flow device 12, which adverse pressure gradient induces friction and pressure drag that ultimately increases the separation potential of fluid 2. As such, the presence of adverse pressure signals less than optimal flow. The location of each optimal pressure recovery point is a calculated determination that dictates the placement of fluid flow regulators 10.

Since fluid flow may separate at various locations, surface 14 may comprise several optimal pressure recovery points 34. As fluid 2 travels over surface 14 of object 12 it possesses identifiable or quantifiable characteristics and parameters with regards to its velocity, drag ratio, pressure, density, viscosity, and others. These are largely determined by the existing environmental conditions, as well as the particular design parameters and characteristics of the object and its surface, such as shape, size, texture, and other aerodynamic or design factors. Thus, as fluid 2 flows over surface 14, these parameters are defined. However, at the same time they are continuously changing as dictated by the same factors. Thus, fluid 2 will possess certain characteristics, properties, and behavior just prior to its introduction across surface 14 of object 12. Once introduced to object 12, fluid 2 will undergo many influencing forces caused by the moving or dynamic object 12 passing through fluid 2 or fluid 2 passing over a stationary object 12. These influencing forces will, among other things, disrupt the equilibrium of the fluid, induce pressure differentials or gradients, and cause fluid separation; and all along surface 14, fluid 2 will try to compensate and stabilize or equalize itself. This disruption is even more evident as fluid 2 leaves surface 14. Often, leaving surface 14 will induce the greatest amount of disruption or turbulence in fluid 2 as the fluid must abruptly leave a surface to which it is trying to adhere. During this transitional period from the time a fluid exists prior to introduction to an object, to the time the fluid is passing over or through the surface, to the time the fluid leaves the surface of the object has been the focus of years of study and experimentation. As discussed above, significant strides in these areas have been made, but serious problems associated with boundary layers, fluid separation, pressure equilibrium, drag, and turbulent vs. laminar flow still remain.

With reference to FIGS. 2-A, 2-B, and 2-C, and particularly 2-C, shown is an exemplary object 12. FIG. 2-C illustrates the effective "touch and go" or pulse flow phenomenon created by fluid flow regulators 10 featured over surface 14 of object 12. Specifically, FIG. 2-C illustrates a cross-sectional view of object 12. As can be seen, fluid 2 flows over surface 14 initially at front surface 15 and leaves at trailing surface 17. What happens between as fluid 2 passes over surface 14 of object 12 is unique to the present invention. As fluid 2 initially contacts front surface 15, it begins its flow across surface 14, wherein various fluid dynamic forces act upon fluid 2, thus inducing a state of imbalance within fluid 2. This imbalance induces an adverse pressure gradient that, if left unregulated, will cause fluid 2 to detach from surface 14 and become very turbulent. As such a fluid flow regulator 10 is precisely positioned at an optimal pressure recovery point 34. Optimal pressure recovery point 34 is defined herein as a location about surface 14 at which attached fluid comprises a pressure differential that generates an adverse pressure gradient acting to induce fluid separation.

As such, optimal pressure recovery points 34 are predetermined and defined for each object and for each intended operating condition. Moreover, a fluid flow regulator 10 is never randomly positioned, but instead strategically placed at an optimal pressure recovery point. Thus, first fluid flow regulator 10-a of FIG. 2-C in the direction of fluid flow is correctly positioned at optimal pressure recovery point 34-a as this location will provide the ability to regulate the pressure gradient in fluid 2 as needed.

To regulate the inherent pressure gradient, first fluid flow regulator 10-a performs a pressure recovery function. As fluid 2 contacts front surface 15 and travels about surface 14 it encounters fluid flow regulator 10-a comprising a pressure recovery drop 26-a and drop face 30-a. As fluid passes over pressure recovery drop 26-a it encounters sub-atmospheric barrier 38-a. Because this is a low pressure barrier, fluid 2 literally drops off of pressure recovery drop 26 and contacts surface 14 as indicated by the arrows. The fluid then briefly detaches from surface 14 (indicated by the upward arrows) and then subsequently reattaches almost instantaneously, wherein fluid 2 is re-energized. This "touch and go" phenomenon functions to recover pressure at the optimal pressure recovery point 34-a, wherein the pressure gradient is reduced and the pressure differential cured. All of this effectually allows fluid 2 to continue in an attached state, as well as in a returned state of equilibrium. The drop in pressure is made instant so that the adverse dynamic forces acting on fluid 2 may be overcome and eliminated.

It is recognized that fluid 2 may still comprise somewhat of a pressure differential downstream from fluid flow regulator 10-a. In addition, it is recognized that fluid flow conditions within an internal flow device may change or vary. Therefore, object 12, and particularly surface 14, may comprise or feature several optimal pressure recovery points 34 requiring a plurality of fluid flow regulators. In this case, it becomes necessary to determine the location of subsequent optimal pressure recovery point(s) 34, shown as pressure recovery point 34-b. The location of second optimal pressure recovery point 34-b downstream from primary or first optimal pressure recovery point 34-a is also predetermined and comprises a calculated location determined preferably as follows. Once fluid 2 passes over primary optimal pressure recovery point 34-a it briefly separates, then reattaches in a re-energized state as discussed above. However, if pressure gradients remain in fluid 2 these must be equalized or the flow of fluid 2 within internal flow device is not truly optimal or optimized. As such, second fluid flow regulator 10-b is placed at optimal pressure recovery point 34-b. The location of second pressure recovery point 34-b is located at a location at least past the point at which fluid 2 re-attaches after encountering and passing over fluid flow regulator 10-a and pressure recovery drop 26-a. If second fluid flow regulator 10-b is placed at a location on surface 14 encountered by fluid 2 prior to it reattaching to surface 14, then the disruption in fluid 2 is only exacerbated and the fluid will be significantly less than optimal. This is because as fluid 2 drops over first or primary pressure recovery drop 26-a and detaches from surface 14, it suddenly expends its energy stored within the molecules making up fluid 2. This energy is retrieved as fluid 2 reattaches to surface 14. If second fluid flow regulator 10-b is placed at a location where the fluid is in this detached state, the second drop in pressure would induce a significant adverse pressure gradient that would cause the fluid to eddy and become extremely turbulent. As such, second fluid flow regulator 10 should be placed at at least a location, such that at the time fluid 2 encounters second fluid flow regulator 10-b it is reattached and re-energized. At such an optimal location, fluid 2 may then pass over second fluid flow regulator 10-b with the same results as discussed above as it passed over first fluid flow regulator 10-a. This continuous "touch and go" phenomenon may be repeated as often as necessary until fluid 2 is in its maximized optimal state of attached flow. By providing multiple fluid flow regulators, the flow of fluid 2 may be said to be "pulsed," or rather object 12 comprises pulsed fluid flow about its surface(s) caused by the sudden and multiple pressure recovery drops.

The present invention functions to significantly improve fluid flow over a surface of an object and to eliminate the problems of prior art aerodynamic surfaces intended to encounter fluid flow. Although not all properties, functions, characteristics, parameters, relationships, and effects are entirely understood, the present invention seeks to set forth a unique way of influencing the behavior of fluid over a surface. In the present invention, as fluid 2 flows over at least a portion of surface 14 it is disrupted from its current existing and substantially equalized state. Most likely, due to several factors, the fluid will become more turbulent as the molecules of the fluid interact with and pass over the molecules of surface 14. An increase of turbulence typically means an increase of pressure drag leading to a decrease in velocity of the fluid, as well as an increase in the density and viscosity of the fluid. However, the present invention is designed to reduce this disruption, and thus the turbulence, of the fluid by reducing the overall pressure drag and friction drag. Reducing each of these will significantly increase the pressure recovery potential of the surface, which will, in turn, increase the attachment potential of the fluid (or decrease the potential for separation of the fluid). Increasing the attachment potential functions to create a much more laminar and efficient flow of fluid 2 over surface 14.

To accomplish the functions just described, object 12, and particularly surface 14 has formed therein at least one, and preferably a plurality of, fluid flow regulators 10. Thus, as fluid 2 flows across surface 14, it encounters fluid flow regulators 10, and particularly pressure recovery drop 26. At this precise point or location, which is shown as optimal pressure recovery point 34, there is a significant and immediate or sudden reduction in pressure or drop in pressure caused or induced by fluid flow regulator 10, and particularly pressure recovery drop 26, such that fluid 2 essentially drops over or falls off of pressure recovery drop 26, which results in a significant reduction in pressure drag. This sudden drop in pressure creates a sub-atmospheric barrier or shield 38 directly at the base of pressure recovery drop 26. Sub-atmospheric barrier 38 is a low pressure area that essentially creates a barrier or cushion between surface 14 and fluid 2. This barrier is created and exists directly adjacent drop face 30 where it is the strongest. The farther away from pressure recovery drop 26 along surface 14, barrier 38 decreases as is illustrated by the tapering off of barrier 38 as the distance from pressure recovery drop 26 increases. Essentially what is happening is that the sudden drop in pressure that occurs at pressure recovery drop 26 is the greatest, thus creating the strongest barrier. As the distance away from pressure recovery drop 26 increases in the direction of fluid flow, the pressure on surface 14 begins to increase and sub-atmospheric barrier 38 begins to dissipate or diminish. At the instance of sudden pressure drop, the pressure coefficient (a non-dimensional form of the pressure defined as the difference of the free stream and local static pressures all divided by the dynamic pressure) at the base of drop face 30 is increased. As stated, sub-atmospheric barrier 38 is a low or reduced pressure area. It's function or effect is to decrease the molecular activity occurring between the molecules at surface 14, the boundary layer, and those existing within the free stream of fluid 2. This reduction in molecular activity may be described as a reduction in the kinetic energy of the molecules, which kinetic energy increases the tendency of the molecules present within fluid 2 to adhere or stick to surface 14, a phenomenon commonly referred to as skin friction drag, surface viscosity, or friction drag. These forces are directly related to the surface texture, the molecular movement and interaction at the surface of an object, as well as the magnitude of turbulence experienced by the fluid across the surface, and contribute to such phenomenon as vortices, a problem often associated with aircraft flight.

Sub-atmospheric barrier 38 comprises a low pressure area of fluid molecules possessing decreased kinetic energy. The decrease in kinetic energy is a result of the sudden drop in pressure induced at or by pressure recovery drop 26. These low energy molecules effectively provide a barrier between the higher or more energetic molecules in the free stream of fluid and the molecules of the surface. Stated another way, sub-atmospheric barrier 38 functions to cushion the more energetic molecules in the free stream from the molecules in the surface of the object. What results is a much for laminar flow and an increase in attachment potential, or decrease in separation potential because the fluid is in a greater state of equilibrium.

The present invention fluid flow regulator 10 may also be termed a surface pressure gradient regulator because of its ability to regulate or control or influence pressure gradients along the surface of an object, as well as pressure drag and pressure recovery across surface 14. It is a well know fact that a fluid will follow the path of least resistance. The pressure gradient regulator allows us to regulate the pressure fields at the boundary layer of any said surface. This manipulation of pressures will allow us to manipulate the flow field of a fluid in motion around an object. The ability to regulate pressure drag stems from the sudden pressure drop at the optimal pressure recovery point 34, which pressure drop induces or creates a sub-atmospheric barrier 38 that functions to improve the flow of a fluid across surface 14 of object 12. Specifically, the present invention sub-atmospheric barrier 38 improves fluid flow by reducing pressure and friction drag and turbulence. This is accomplished by creating a cushion of low pressure that reduces the degree and intensity of molecule collisions occurring at the boundary layer that leads to separation of the fluid from surface 14. Thus, as a fluid 2 passes over each of the small, strategically placed, fluid flow regulators 10, there will be experienced a significant and sudden drop in pressure of fluid 2, resulting in an increase in the pressure coefficient. Naturally, as the pressure drops at pressure recovery drop 26, there is experienced an increase in the velocity of fluid 2, wherein this increase in velocity naturally results in a decrease in the density of fluid 2. This decrease in density at the boundary layer, functions to reduce the number of molecules capable of colliding with the molecules existing within the free stream of fluid 2 at the boundary layer. Subsequently, this reduction in experienced molecule collisions at the boundary layer reduces separation of fluid 2 and improves the overall efficiency of the flow of fluid 2, thus decreasing drag and turbulence, and ultimately creating a much more efficient aerodynamic surface.

FIG. 2-B illustrates a side cross-sectional view of an object 12 having a surface 14 and one or more fluid flow regulators 10 therein, wherein said fluid flow regulator 10 comprises a pressure recovery drop 26 having a plurality of drop faces therein, shown as drop faces 30-a and 30-b. In this embodiment, fluid flow regulator 10 induces multiple pressure drops creating sub-atmospheric barriers 38-a and 38-b, which each function to optimize fluid flow. Specifically, as fluid 2 encounters pressure recovery drop 26, it becomes subject to drop face 30-a and a sudden pressure drop is induced, thus generating sub-atmospheric barrier 38-a. Immediately following drop face 30-a is drop face 30-b. Thus, fluid 2 immediately encounters drop face 30-b and induces a second sudden or immediate pressure drop, thus generating second sub-atmospheric barrier 38-b. The advantage of building in a plurality of drop faces 30 into pressure recovery drop 26 is that fluid 2 is influenced to an even greater degree, with all of the effects discussed herein magnified.

Fluid flow regulator 10 and it associated method provides the ability to achieve the greatest state or equalization and/or harmony between the molecules in fluid 2 and surface 14 of object 12 over which fluid 2 passes. Equalization or harmony between fluid and surface molecules is increased significantly as fluid 2 and the molecules directly adjacent surface 14 (those in the boundary layer) interact less violently as a result of sub-atmospheric barrier or shield 38 created by fluid flow regulator 10.

Figure 3:
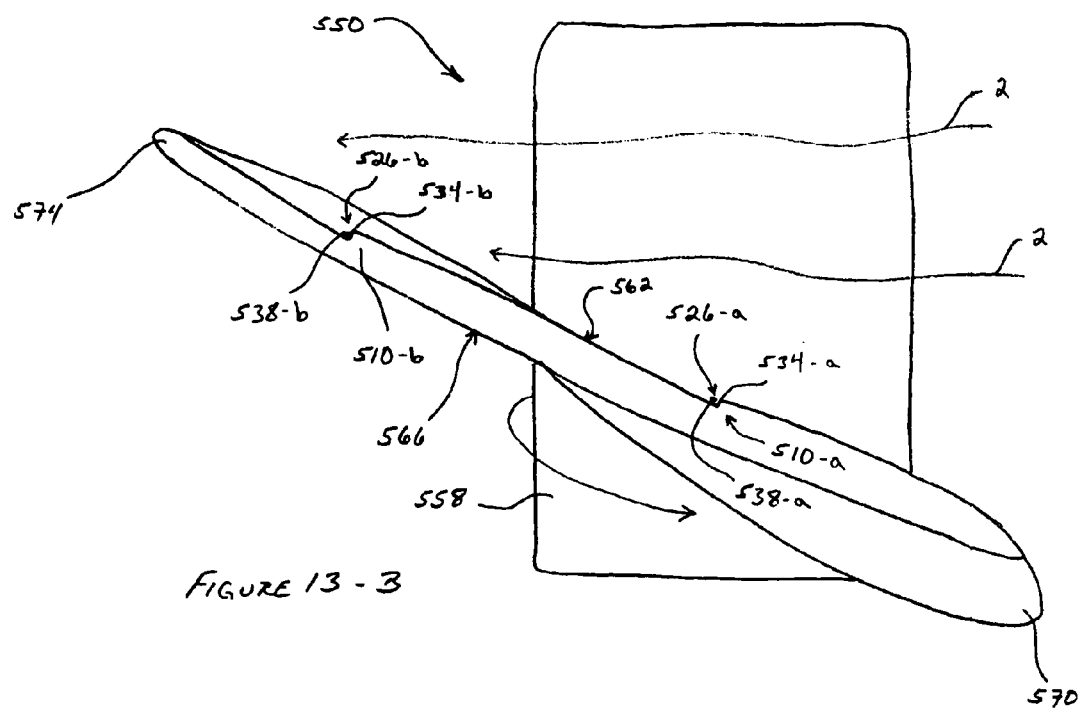
FIG. 3-A illustrates a side cross-sectional view of an object having a streamlined surface and the pressure gradients or pressure drag existing along the surface.

With reference to FIGS. 3-A, 3-B, and 3-C, shown is the relationship of fluid flow 2 over surface 14 of object 12 to pressure. When an object experiences fluid flow across one or more of its surfaces, the object becomes subject to, among other things, pressure drag and friction drag. Each of these decrease the efficiency of fluid flow, as well as cause the fluid to flow more turbulently than laminar. Indeed, the less pressure drag and friction drag that is induced across the surface the more laminar the flow across that surface will be. Just the opposite is also true. The greater the pressure drag and friction drag induced across the surface, the more turbulent the flow across the surface will be.

As can be seen from FIG. 3-A, a smooth or semi-smooth surface 14 is presented and introduced to fluid flow 2. Upon initial contact of fluid 2 with a front portion 16 of object 12, a significant amount of pressure drag is induced on front portion 16, illustrated as pressure drag 42. As the fluid progressively passes over surface 14, fluid 2, or rather the molecules within fluid 2, react with the molecules of surface 14, wherein a significant amount of surface friction is induced, known and illustrated as friction drag 46. The further along surface 14 fluid 2 travels, the greater the disturbance in flow that is caused by this friction drag. This has the effect of increasing the pressure along surface 14. In other words, there is an upward pressure distribution along surface 14 caused by the friction created between the molecules in fluid 2 and the molecules in surface 14. In addition, as fluid 2 progresses across surface 14, the fluid begins to detach from surface 14. This detachment of fluid 2 from surface 14 is commonly referred to as separation. Friction leads to separation and separation leads to an increase in turbulence of fluid flow. Thus, FIG. 3-A illustrates an unmodified surface 14, wherein it can be seen that a significant amount of initial pressure drag 42, friction drag 46, and final pressure drag 54 exists, each of which will cause fluid 2 to separate and exhibit a greater amount of turbulence across surface 14.

FIG. 3-B illustrates the same object 12 shown in FIG. 3-A, only FIG. 3-B illustrates object 12 as having a fluid flow regulator 10 incorporated therein. As can be seen, fluid flow regulator 10, and particularly pressure recovery drop 26, is placed at the precise point at which separation of fluid 2 begins. This location is described herein as optimal pressure recovery point 34 and represents the point at which pressure is recovered via fluid flow regulator 10. Drop face 30 comprises a height capable of inducing pressure recovery at optimal pressure recovery point 34. As can be seen from FIG. 3-B, fluid begins to separate from surface 14 as it progresses along surface 14. This separation is illustrated by the arrows extending up from surface 14 at optimal pressure recovery point 34. It is at this point that fluid flow regulator is placed and the point at which pressure recovery drop 26 induces a sudden pressure drop, thus functioning as a pressure recovery mechanism. By incorporating a fluid flow regulator 10 into object 12, and particularly surface 14, several effects result, including the lowering or reducing of pressure drag 42 located at the front 16 of object 12, friction drag 46 located along surface 14, and pressure drag 50 located at the end of object 12. Each of these is illustrated in FIG. 3-C where it is shown that pressure drag 42, friction drag 46, and pressure drag 50 are all significantly reduced, thus signaling powerful pressure recovery capabilities of fluid flow regulator 10. Moreover, it can be seen that pressure drag 42 and pressure drag 50 are more equal than the same pressure drags found on object 12 of FIG. 3-A. Equalization of these two opposing pressure drags is a direct result of the pressure recovery that takes place at the location of fluid flow regulator 10. From this it can be seen that fluid flow regulator 10 significantly influences the behavior of the fluid over surface 14. This effect may lead to significant design changes in both form and function of fluid-exposed surfaces and objects.

Depending upon the length of the surface or any other design considerations, it may be necessary to employ multiple fluid flow regulators. For example, if a surface is long and fluid flow over that surface is required to travel a substantial distance the fluid may once again begin to separate from the surface after passing the first fluid flow regulator. As such, this subsequent point of separation may be considered a second optimal pressure recovery point and may necessitate the addition of a second fluid flow regulator. In essence, multiple fluid flow regulators may be utilized to carry out the intended function of recovering pressure and increasing the laminar flow of the fluid over the entire surface and the present invention contemplates these.

Figure 4:
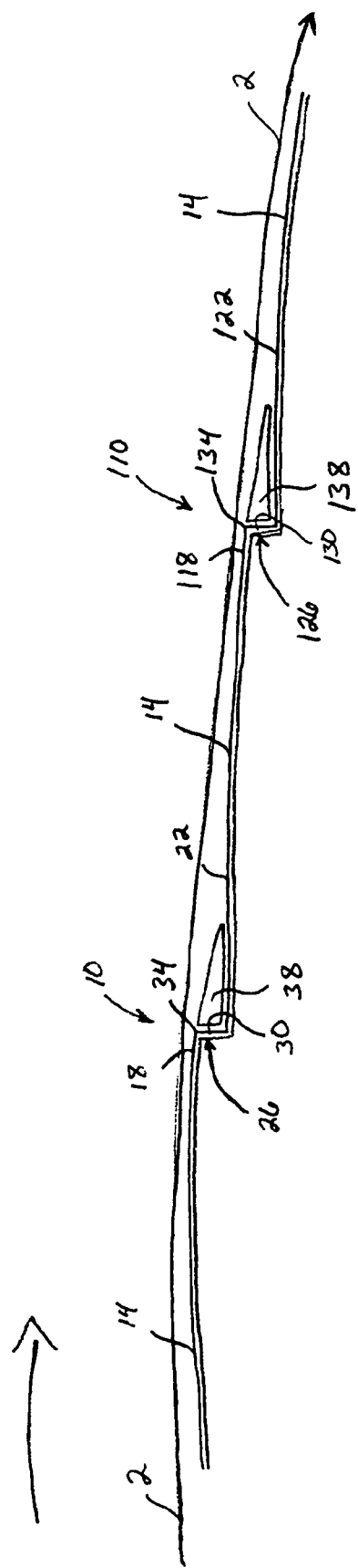
FIG. 4 illustrates a side cross-sectional view of a plurality of fluid flow regulators situated along the surface of an object and the direction of airflow with respect to the fluid flow regulators.

FIG. 4 illustrates an embodiment comprising object 12 having first fluid flow regulator 10 and second fluid flow regulator 110 integrally formed within its surface 14. First and second fluid flow regulators 10 and 110 function similarly, only second fluid flow regulator 110 is located at a second optimal pressure recovery point 134 and comprises leading edge 118 leading into pressure recovery drop 126, and trailing edge 122 extending away from pressure recovery drop 126. Second optimal pressure recovery point 134 exists at the point at which fluid 2 begins to separate once again from surface 14 following its passing over first fluid flow regulator 10. Thus, once fluid 2 begins to separate again, it encounters second fluid flow regulator 110, which induces a sudden pressure drop at pressure recovery drop 126, which in turn creates second sub-atmospheric barrier 138 over which fluid 2 passes in an increased laminar state. As such, multiple fluid flow regulators function to maintain the laminar flow characteristics of fluid 2 over the entire length of surface 14. As stated, a plurality of fluid flow regulators may be utilized as necessary.

In one exemplary embodiment, fluid flow regulator 10 is integrally formed with and part of surface 14. As such, leading edge 18, pressure recovery drop 26, and trailing edge 22 are integrally formed with and part of surface 14. This arrangement represents the embodiments illustrated in FIGS. 1–4. Moreover, fluid flow regulator 10 preferably spans the length or width of surface 14, but may also be designed to extend only a limited distance across surface 14.

Figure 5:
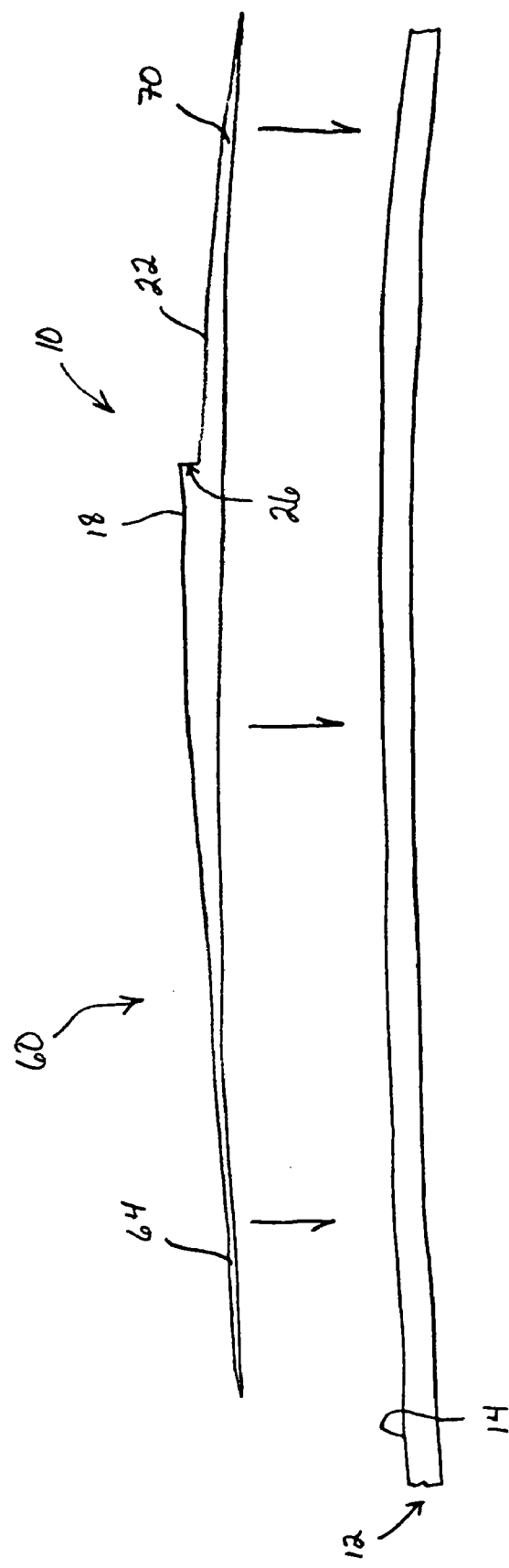
FIG. 5 illustrates a side cross-sectional view of a removable or detachable fluid flow regulator device capable of attaching or adhering to a surface to provide one or more fluid flow regulators thereon.

In another exemplary embodiment, illustrated in FIG. 5, fluid flow regulator 10 may comprise a separate fluid control device 60 that removably attaches to an existing surface 14. Fluid control device 60 comprises one or more fluid flow regulators 10 that function as described herein. FIG. 5 illustrates fluid control device 60 as comprising an transition extension 64 that, when attached to surface 14, provides a smooth transition for fluid 2 as it travels across surface 14 onto fluid control device 60. Transition extension 64 comprises a gradual slope that extends up to and connects to leading edge 18. Leading edge 18 then transitions into pressure recovery drop 26 as discussed above. Fluid control device 60 further comprises a trailing edge 22 that transitions with another transition extension 70 that once again slopes downward toward surface 14 to provide a smooth transition for fluid 2 from fluid control device 60 to surface 14. Of course, it a transition from surface 14 to fluid control device 60 is unnecessary, fluid control device can be made to completely cover surface 14 so that fluid control device 60 becomes the surface of object 12. Either way, fluid control device 60 attaches to an existing surface 14 and essentially functions as a quasi surface over which fluid 2 flows. Fluid control device 60 may be attached to surface 14 using various attachment means, including adhesives, screws, snaps, hook and loop fastener, etc. Fluid control device 60 may also attach to surface 14 using some type of connection or joint, such as a slot or groove arrangement.

In addition to the contemplation of multiple fluid flow regulators, the present invention further contemplates differing heights between one or more fluid flow regulators along the same surface. Again referring to FIG. 4, second pressure recovery drop 126 may have a drop face 130 that comprises a different height than first pressure recovery drop 26 and associated drop face 30. As indicated above, the pressure gradients existing along a surface are different in degree or magnitudes. The degrees or magnitudes of these pressure gradients are also not static, but vary and fluctuate through a range during the time the fluid is flowing over the surface of the object, according to and as a result of several known factors. To account for these varying and changing or fluctuating pressure gradients, the height of each drop face on each pressure recovery drop can be designed to effectively recovery the most pressure. The height of each drop face will largely be dependent upon the amount of pressure recovery needed at a particular pressure gradient to achieve optimal fluid flow over the surface at that particular location and instance. In one embodiment, subsequent pressure recovery drops will most likely comprise shorter drop faces than their preceding counterparts as much of the pressure recovery in the fluid will be recovered by the initial pressure recovery drop. Therefore, a less drastic reduction in pressure or less pressure recovery will be required at subsequent pressure recovery drops to continue or maintain the optimal fluid flow. Or, the pressure gradient across the surface will be controlled by successive fluid flow regulators having different heights so that pressure, and therefore separation, is kept to a minimum, or within acceptable or desired levels.

Figure 6:
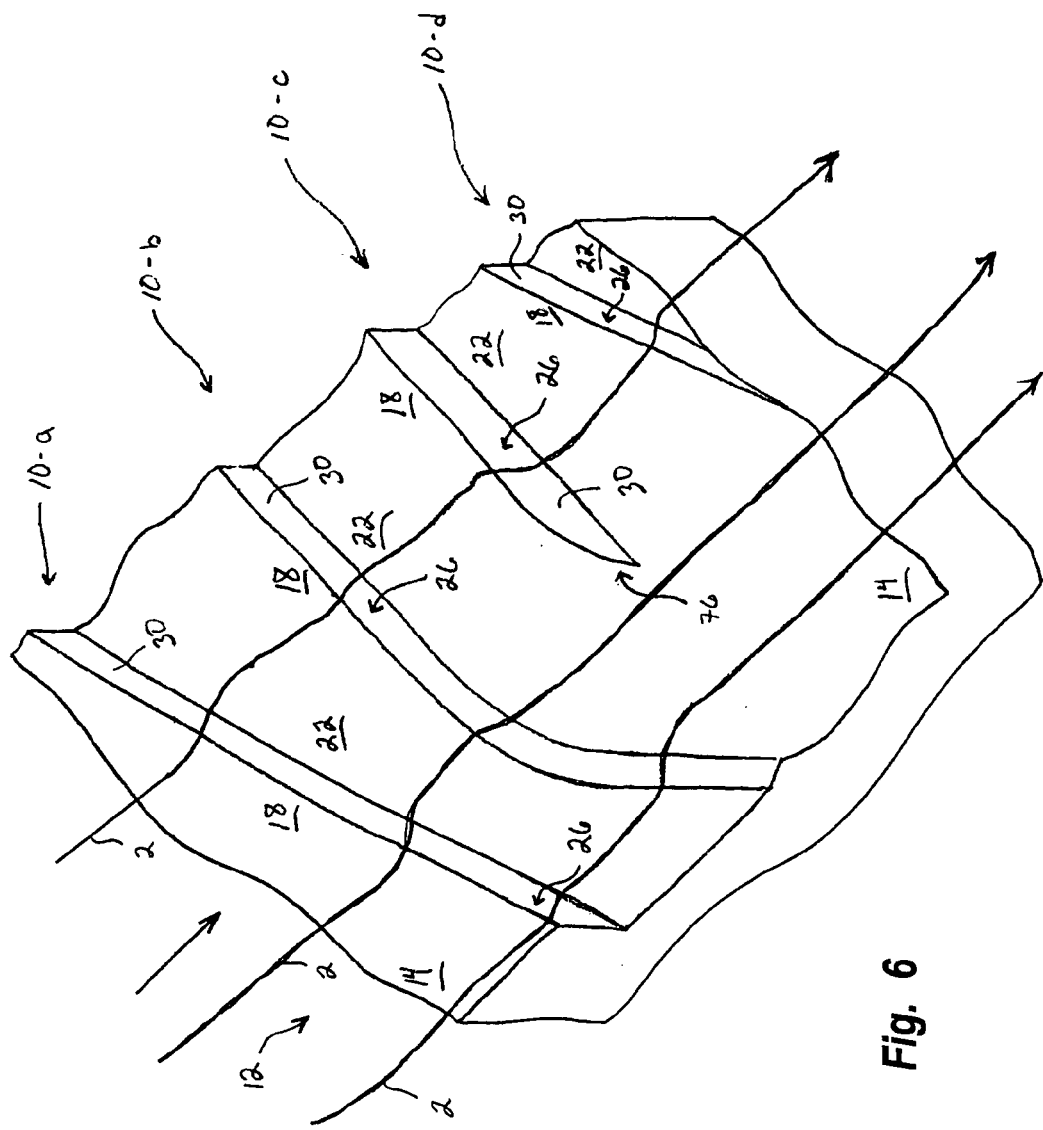
FIG. 6 illustrates an isometric cut away view of a surface having a plurality of fluid flow regulators thereon arranged in several different orientations with respect to fluid flow.

The present invention also contemplates that one or more fluid flow regulator(s) may comprise different orientation arrangements along a single surface of an object, or that a fluid flow regulator may be arranged at any angle to fluid flow, although perpendicular or substantially perpendicular is preferred, depending largely upon the direction of fluid flow, the shape of the object, the function of the object, the type of fluid, and any others recognized by one of ordinary skill in the art. Referring now to FIG. 6, shown is object 12 comprising a surface 14, wherein surface 14 comprises a plurality of fluid flow regulators 10 thereon, shown as fluid flow regulators 10-a, 10-b, 10-c, and 10-d, each comprising a leading edge 18, a trailing edge 22, a pressure recovery drop 26, and a drop face 30. As can be seen, one or more fluid flow regulators 10 may be placed on a single surface 14, as desired. In addition, fluid flow regulators 10 may comprise any size, length, shape, curvature, etc. Still further, fluid flow regulators 10 may comprise different drop face heights. And, still further, fluid flow regulators 10 may be arranged or oriented as required or desired to induce and maintain optimal fluid flow across surface 14. Typical orientations include fluid flow regulators that are perpendicular to fluid flow, that are on acute angles to fluid flow, that comprise one or more curved segments, etc. The foregoing is evident by fluid flow regulator 10-a comprising a linear design, yet is on an acute angle with respect to the direction of flow of fluid 2. Fluid flow regulator 10-b comprises a linear segment that transitions into a curved segment. Fluid flow regulator 10-c comprises a limited length that further comprises a blended end 76 that gradually blends into surface 14. Fluid flow regulator 10-d comprises a linear design similar to fluid flow regulator 10-a, but further comprises shorter or lower profile drop face 30. FIG. 6 illustrates several possible configurations, namely sizes, shapes, and orientations, that fluid flow regulators may comprise over a single surface. However, these are not meant to be limiting in any way. Indeed, engineering design parameters, environmental conditions, and other factors will lead one ordinarily skilled in the fluid dynamics art to conclude or recognize other potential configurations. The present invention, although impossible to recite, contemplates each of these and each is intended to fall within the scope of the description and claims presented herein.

Fluid flow regulators may be integrally formed within the surface of an object, or attached via a removable attachment device, as discussed above. Essentially, no matter how fluid flow regulators are related to or incorporated into the surface of an object, either integrally formed, part of a removable device, cut-out of the surface, etc., the term "featured" as used herein and in the claims is meant to cover each of these.

In another embodiment, fluid flow regulators may comprise a mechanism or system comprising individually operating, yet interrelated component parts that function to provide or create one or more fluid flow regulators in a surface, wherein the fluid flow regulators are dynamically adjusted or adjustable. Because an object in fluid flow experiences a number of different and changing or varying influencing forces or environmental conditions that result in varying surface and fluid flow characteristics, such as pressure gradients along or across its surface, it follows that an adjusting or adjustable fluid flow regulator would be advantageous to maintain optimal fluid flow during the entire time the object is experiencing fluid flow over its surface and to account for these varying or changing conditions, thus allowing the fluid to achieve its greatest flow potential across the surface of the object. Thus, the present invention features a dynamic or adjustable fluid flow regulator capable of altering its physical characteristics, location, and/or existence altogether, as well as compensating for varying fluid flow conditions. Any of the component parts of the fluid flow regulator may be designed to move or adjust to vary the height of drop face and pressure recovery drop, such as designing the leading edge, the pressure recovery drop, and/or the trailing edge to comprise the ability to adjust to vary the height of pressure recovery drop. In addition, the surface or object may comprise one or more elements or components that are utilized in conjunction with the fluid flow regulator to vary the height of the drop face. In essence, the present invention contemplates any device, system, etc. that is capable of adjusting the pressure recovery drop on demand an in response to varying situations or conditions. The dynamic fluid flow regulator may be mechanically actuated, or designed to oscillate in response to changing conditions.

In addition, the present invention contemplates the ability for dynamic fluid flow regulator to the vary pressure recovery drop, and particularly the height of the drop face therein, either consistently along the length of the pressure recovery drop, wherein the drop face would comprise the same height along its entire length, or inconsistently along the length of the pressure recovery drop, wherein the drop face would comprise different heights along the its length. This would account for velocity and pressure differentials across the surface of the object at the location of the fluid flow regulator.

With reference to FIG. 7-A, shown is one exemplary embodiment of a dynamic fluid flow regulator. Specifically, object 12 is shown comprising a surface 14 having a recess 80-*a* and a recess 80-*b*, each created in surface 14. Recess 80-*a* comprises a cut-away portion of object 12, such that pressure recovery drop 26, and particularly drop face 30 is created therein. Recess 80 specifically comprises a horizontal surface 14-*a* that is integrally formed with and part of surface 14 of object 12, and a vertical surface 30-*a* that functions as pressure recovery drop 26 and drop face 30. Recess 80-*b* comprises a cut-away portion of object 12, such that pressure recovery drop 26, and particularly drop face 30 is created therein. Recess 80 specifically comprises a horizontal surface 14-*b* that is integrally formed with and part of surface 14 of object 12, and a vertical surface 30-*b* that functions as pressure recovery drop 26 and drop face 30. To create dynamic fluid flow regulator 10, rotatably attached to object 12 at a distal location from drop face 30, using one or more attachment means, is an adjustable plane 82. Adjustable plane 82 comprises a surface that closely fits and interacts with pressure recovery drop 26, and that adjusts on demand to vary the height of drop face 30. Thus, variations in pressure drag, friction drag, velocity, fluid viscosity and other factors or conditions that occur and develop as fluid 2 flows over object 12 can be monitored and compensated for simply by actuating adjustable plane 82, which subsequently alters the height of drop face 30 and pressure recovery drop 26, as needed. Monitoring devices common in the industry may be used to monitor the conditions and characteristics of both the fluid flow and the object.

Dynamic fluid flow regulator 10, and particularly adjustable plane 82, may also be designed to comprise transverse movement that allows adjustable plane 82 to move bi-directionally in a horizontal manner to preserve a tight relationship between end 86 and drop face 30 and to ensure drop face 30 is perpendicular to surface 14. In addition, end 86 preferably seals tightly against drop face 30 at all times and at all vertical positions.

Moreover, the present invention fluid flow regulator(s) may be designed so that the position or location of the fluid flow regulators altogether may be selectively altered. This embodiment is contemplated because the optimal pressure recovery point(s) along a surface may not always be in the same location. For example, faster fluid velocities, different altitudes, varying pressures, and other forces, may cause optimal pressure recovery points to vary along the surface. As such, the dynamic fluid flow regulators may be designed to comprise the ability to undergo selective vector movement, meaning that they may be moved or repositioned in any direction along the surface to once again be in alignment with an optimal pressure recovery point.

In operation, dynamic fluid flow regulator 10 functions to regulate varying pressure gradients across surface 14 by continuously altering the potential pressure recovery at one or more optimal pressure recovery points 34. Continuously altering the potential pressure recovery involves monitoring the pressure gradients acting upon the surface to determine whether these pressure gradients are strong enough to induce separation of the fluid from the boundary layer created along surface 14 from the flow of fluid. Monitoring devices and/or systems commonly known in the art for monitoring pressure and friction drag and fluid separation would be able to indicate whether there was a need for actuation of dynamic fluid flow regulator 10 to recover pressure and maintain the attachment of the fluid in a laminar, optimal flow at that point or location on surface 14. As fluid flows over surface 14, dynamic fluid flow regulators 10 would be placed at those locations most likely to experience separation. However, often pressure gradients along a surface exhibit significant pressure differentials. Utilizing dynamic fluid flow regulator provides the means for compensating for these differentials. For instance, in a controlled environment, if a fluid is flowing over a surface at a constant rate, the flow is easily predicted and the determination of the number, placement, and design of fluid flow regulators is simple. However, as conditions change, either with respect to the fluid or the object, it may become necessary to modify or change the design, placement, or number of fluid flow regulators to compensate for the change and maintain separation and optimal fluid flow. This is even more true in an uncontrolled, natural environment. As such, dynamic fluid flow regulators serve such a purpose. For a set of given conditions, adjusting plane 82 may be set so that pressure recovery drop 26 comprises a pre-identified drop face height. This height is calculate to provide the necessary amount of pressure recovery at that point to prevent separation and maintain laminar fluid flow. As conditions change, adjusting plane 82 may be adjusted up or down as indicated by the arrows to increase or decrease the height of drop face 30. Adjusting plane 82 is adjusted by rotating attachment means 84 connecting adjusting plane 82 to object 12. Thus, if the pressure drag and friction drag at that point increase, separation may result if pressure recovery drop 26 is fixed at its original position. To overcome separation and maintain optimal fluid flow, adjusting plane 82 is actuated to lower, and therefore, increase the distance or height of drop face 30, which has the effect of creating a greater drop in pressure leading to increased pressure recovery. The degree adjusting plane 82 is adjusted is a calculated determination to be made considering all known and relevant factors.

Adjusting plane 82 may also move horizontally back and forth as needed. Horizontal movement may be necessary to keep the travel of end 86 as linear as possible, and as close to drop face 30 as possible, especially if the distance adjusting plane 82 is required to travel is substantial. If adjusting plane 82 is not allowed to move horizontally, end 86 would travel along an arc and would separate from drop face 30 at some point, thus frustrating the intended function and effects of fluid flow regulator 10.

FIG. 7-B illustrates another exemplary embodiment of a dynamic fluid flow regulator. In this embodiment, dynamic fluid flow regulator 10 also comprises an adjusting plane 90. However, in this embodiment, adjusting plane 90 moves vertically up and down as needed to adjust pressure recovery drop 26 and drop face 30. Adjusting plane 90 is caused to move up and down by actuating one or more lifts 98. Although the mechanism illustrated in FIG. 7-B is different than that shown in FIG. 7-A, the function and effect is the same. Essentially, pressure recovery drop 26 and drop face 30 is allowed to increase or decrease in response to changing or varying fluid flow conditions for the purpose of inducing the proper amount of pressure recovery along surface 14 to ensure optimal fluid flow.

Although not illustrated, the present invention further features a fluid flow regulator that may be adjustably or selectively positioned along surface 14. Often during fluid flow, due to many contributing factors, the point along surface 14 at which separation begins will vary in location. As such, it becomes necessary to be able to identify each of these optimal pressure recovery points 34 and to place a fluid flow regulator at that point. Allowing fluid flow regulators to be selectively positioned along surface 14 greatly increases the potential for proper and optimal pressure recovery and for reducing flow separation.

It should be noted that the present invention contemplates any type of system, device, etc. that is capable of adjusting or modifying the design characteristics of fluid flow regulators to regulate the pressure gradients across a surface. Although in the preferred embodiments recited herein these modifications are facilitated by providing one or more dynamic fluid flow separators, these embodiments are only exemplary and not intended to be limiting in any way. Indeed, one ordinarily skilled in the art will recognize other designs that carry out the intended function of the present invention.

The present invention fluid flow regulators, and the surfaces on which these are utilized, offer many significant advantages over prior art surfaces and fluid flow regulating devices or systems. Although several advantages are specifically recited and set forth herein, fluid dynamics is an extremely broad field with many properties still largely misunderstood or unknown, thus making it impossible to identify, describe, and feature all of the possible effects and advantages of the present invention. As such, the intention of the present application is to provide an initial starting point for many extensive and ongoing experiments and studies by all interested. As such, the present invention provides several significant advantages.

First, the fluid flow regulators provide the ability to induce pressure drops on demand. These pressure drops allow the fluid flow regulators to regulate pressure gradients about the surfaces of the objects or bodies on which they are applied. This is significant because the ability to regulate pressure gradients provides the ability to influence, control, and optimize fluid flow about the surface and to reduce the separation and/or separation potential of the fluid. Moreover, the ability to regulate pressure gradients is provided on an as needed basis, meaning that the magnitude of pressure recovery induced can be controlled by varying the physical location and characteristics of the fluid flow regulators.

Second, the fluid flow regulators provide increased and less volatile molecule interaction between the molecules in the fluid and the molecules in the surface. This is largely accomplished by the generation of a sub-atmospheric barrier of low pressure that acts as a cushion between each of these molecules. As such, the boundary layer between the surface and the most adjacent or proximate fluid flow stream is preserved even in stressful or high pressure drag situations.

Third, flow separation is essentially eliminated across the surface of any surface. At each precise point along a surface where flow begins to separate, a fluid flow regulator is placed, thus functioning to induce a sudden pressure drop at that point. This sudden drop in pressure performs the necessary influence on pressure drag and friction drag to effectuate the most appropriate pressure recovery that forces the fluid to remain attached to the surface, and to maintain an optimal flow pattern.

Fourth, fluid flow regulators provide the ability to significantly influence pressure drag by reducing pressure drag at various locations along the surface. Reducing the pressure drag in turn increases pressure recovery, which subsequently lowers the friction drag along the surface. By reducing or lowering friction drag, the potential for fluid separation is decreased, or in other words, attachment potential of the fluid is significantly increased.

Fifth, pressure drag forward and aft a surface is reduced. Moreover, these pressure drags are more likely to be equalized, or these pressure drags are more likely to achieve a state of equilibrium at a much quicker rate.

Sixth, dynamic fluid flow regulators provide the ability to compensate for changing or varying conditions, either environmental, within the flow, or within the object itself, by facilitating the most accurate and strategic pressure drops possible across the surface.

Seventh, the potential and kinetic energy of molecules is more efficiently utilized and accounted for.

Eighth, a surface featuring one or more fluid flow regulators functions to improve the overall efficiency of the object or body or craft on which it is being utilized. By influencing the flow to obtain the most optimal flow state, the object is required to output less power than a similar body or object comprising a streamlined surface makeup.

Ninth, fluid flow regulators significantly reduce noise produced by fluid flowing across the surface of the object. Noise is reduced due to the flow properties being made optimal as compared to streamlined surfaces. Noise reduction can be a significant problem in many fields and applications, such as in the design and operation of jet engines.

These advantages are not meant to be limiting in any way as one ordinarily skilled in the art will recognize other advantages and benefits not specifically recited herein.

Fluid flow regulator 10 may be applied to or formed with any type of surface or object subject to external fluid flow. This surface may be a substantially flat surface, such as found on the wing of an airplane, or on various airfoils and hydrofoils, such as a turbine or similar blade, a prop for a boat or water craft, or on various surfaces comprising bodies, such as the fuselage of an aircraft or rocket, the fairing of an automobile, and any others. In addition, fluid flow regulators may be applied to or formed within a cylindrical or other shaped enclosure, such as a nozzle or venturi, to improve internal fluid flow. It is impossible to recite and describe the numerous possible designs and applications to which the present invention may be present within or applied to. As such, it is contemplated that the present invention will be applicable to any surface subject to fluid flow, whether the object itself is designed to be in motion or whether it is designed to be stationary.

It should also be recognized that the particular design, number, and orientation of the fluid flow regulators is dependent upon the physical limitations or constraints of the object, the performance characteristics of the object, as well as the intended conditions or environment in which the object will operate. Other factors may also be considered as will be recognized by one ordinarily skilled in the art.

The present invention further features a method for influencing external fluid flow over the surface of an object and for influencing the rate and magnitude of pressure recovery along the surface. This method comprises the steps of: featuring at least one fluid flow regulator with one or more surfaces of an object, wherein the fluid flow regulator comprises a pressure recovery drop having at least one drop face formed therein, and wherein the drop face comprises a calculated height; subjecting the object to a fluid, such that the fluid is caused to move about the object; and causing the fluid to encounter the fluid flow regulator, such that the pressure recovery drop induces a sudden drop in pressure as the fluid flows over the fluid flow regulator, wherein a sub-atmospheric barrier is created at the base of the drop face. As such, the fluid flow regulator functions to optimize fluid flow about the object, thus increasing the performance of the object in the fluid.

The present invention further features a method for controlling the flow of fluid across an object's surface. The method comprises the steps of: obtaining an object subject to fluid flow, the object having one or more fluid bearing surfaces over which a fluid may flow; featuring one or more fluid flow regulators as part of the fluid bearing surfaces, wherein the fluid flow regulator optimizes fluid flow and the performance of the object in the fluid; subjecting the object to the fluid; and causing the fluid to flow about the object so that the fluid encounters the one or more fluid flow regulators.

Moreover, the present invention features a fluid control system comprising an object having at least one surface subjected to a fluid, such that the fluid flows about the object; and a fluid flow regulator featured and operable with the surface, wherein the fluid flow regulator comprises the elements and functions as described herein.

Although the present invention is applicable to any solid body object having a surface over which fluid passes, the present invention focuses on three primary systems, devices, or applications, namely airfoils, hydrofoils, and several rotating devices, namely, fans, propellers, turbines, rotors, etc. Each of these is discussed individually below.

Airfoils Comprising a Fluid Flow Regulating System and Method

One advantageous application of the present invention fluid flow regulators relates to the design and performance of airfoils. Although this area has received extensive study and analysis, the present invention furthers airfoil development and technology by providing a fluid flow regulating system and method that drastically improves the performance of airfoils of any size, shape, or design.

Figure 8:
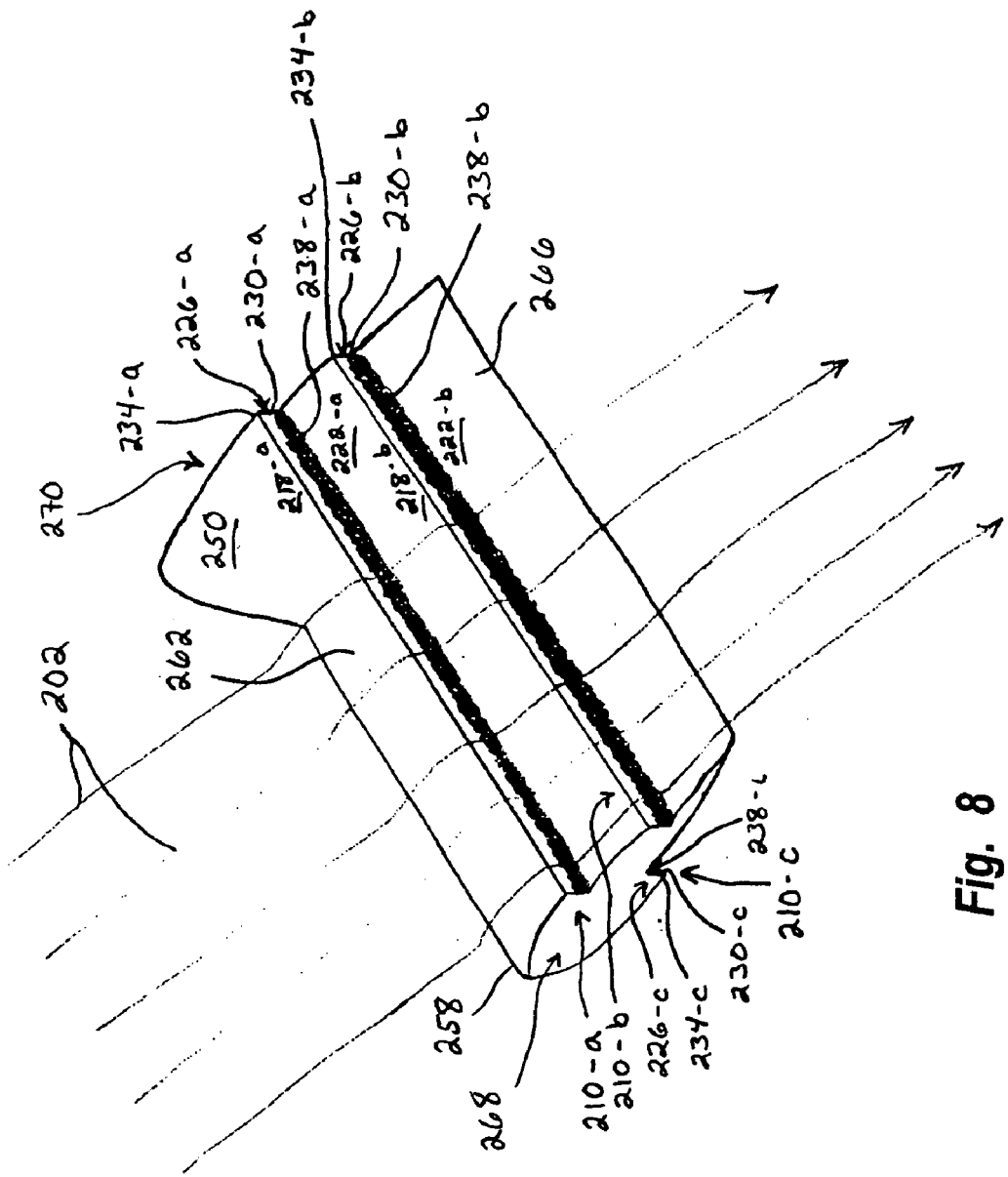
FIG. 8 illustrates an isometric view of an airplane wing having one or more fluid flow regulators formed in the upper and lower surfaces of the wing.

With reference to FIG. 8, illustrated is an isometric view of a cross-section of one particular design of a airfoil, shown as airfoil 200. Airfoil 200 comprises an upper surface 250, a lower surface 254 (not shown), a front or forward surface 258, a leading edge 262, a trailing edge 266, an airfoil tip, 268 and an airfoil root 270. Airfoil 200 further comprises a first fluid flow regulator 210-*a* and a second fluid flow regulator 210-*b* longitudinally oriented perpendicular or substantially perpendicular to flow of air 202 (indicated by the arrow) along upper surface 250. FIG. 8 also illustrates fluid flow regulator 210-*c* existing and positioned on lower surface 254. Fluid flow regulator 210-*c* is also longitudinally oriented along lower surface 254 and is perpendicular or substantially perpendicular to air 202.

First fluid flow regulator 210-*a* is positioned upstream or forward second fluid flow regulator 210-*b* and is the first of the two to encounter air flow 202. Each of these function to influence fluid flow and regulate the pressure gradients existing along upper surface 250. Fluid flow regulator 210-*c* functions in a similar manner, only for or along lower surface 254. Fluid flow regulator 210-*a* comprises the elements discussed above, which are shown herein, namely leading edge 218-*a*, trailing edge 222-*a*, pressure recovery drop 226-*a*, drop face 230-*a*, and optimal pressure recovery point 234-*a*. Fluid flow regulators 210-*b* and 210-*c* also comprise similar elements, with like elements marked with like numbers as indicated (elements 210-*b* to 234-*b* for fluid flow regulator 210-*b*; and elements 210-*c* to 234-*c* for fluid flow regulator 234-*c*).

FIGS. 9-A and 9-B are cross-sectional illustrations of two different exemplary airfoil stricture embodiments comprising or utilizing one or more fluid flow regulators 210. FIG. 9-A illustrates airfoil 200 as comprising a plurality of fluid flow regulators, namely fluid flow regulators 210-*a*, 210-*b*, 210-*c*, 210-*d*, 210-*e* situated on upper surface 250, and fluid flow regulator 210-*f* situated on lower surface 254. FIG. 9-B illustrates airfoil 200 as also comprising a plurality of fluid flow regulators, namely fluid flow regulators 210-*a* and 210-*b* situated on upper surface 250, and fluid flow regulator 210-*c* situated on lower surface 254, only these are arranged in a different configuration than those on airfoil 200 in FIG. 9-A. Fluid flow regulators 210 (illustrated generally as 210) are preferably positioned at or as close to the point of fluid separation as possible. FIGS. 9-A and 9-B simply serve to illustrate that different airfoils or airfoil structures will require a different number of fluid flow regulators, or fluid flow regulators positioned at different locations about the airfoil. As such, the present invention contemplates each of these different configurations and designs. One ordinarily skilled in the art of fluid dynamics over an airfoil surface will be able to calculate precisely the number, location, and orientation of fluid flow regulators to be utilized in a given situation.

Referring back to FIG. 8, as air 202 encounters airfoil 200, and particularly frontal surface 258, it subsequently passes over upper surface 250 and lower surface 254 in which the stability or equilibrium or otherwise current state of the air is disrupted, or rather the molecules in air 202 are disturbed. In addition, as pointed out above, various aerodynamic forces are generated between air 202 and airfoil 200. In effect each of fluid flow regulators 210-*a*, 210-*b*, and 210-*c* function to influence these forces for the purpose of optimizing the flow of air 202 over airfoil 200 and for restoring a state or equilibrium to air 202 as quickly as possible as it leaves airfoil 200.

Specifically, as airfoil 200 begins to move through air 2, the air molecules tend to stick or adhere to upper surface 250 and lower surface 254, thus creating either a turbulent or laminar air boundary layer. In addition, drag forces are at work, namely pressure drag and friction drag. Pressure drag induces a number of pressure gradients about airfoil 200, which are factors in analyzing lift. As the airfoil accelerates through air 202 and the velocity of air about airfoil 200 increases, the pressure drag on both upper and lower surfaces 250 and 254 increases, as does the magnitude of the pressure gradients. In addition, because air is less dense than other fluids, such as water, or is less viscous, the potential for fluid separation is increased, especially in light of the high velocities encountered by an airfoil during air flight.

Prior art airfoils are typically streamlined, meaning that their surfaces are smooth and uniform. This has led experts to be able to predict the response of the airfoil in the air, as well as the behavior of the air itself. However, several problems exist with streamlined designs, evidenced by the several phenomenon that are still largely misunderstood. By providing an airfoil surface having one or more fluid flow regulators, it is believed that several of the problems encountered with streamlined airfoils are reduced, minimized, or even eliminated.

As shown, in FIG. 8, fluid flow regulators 210 are placed at precise optimal pressure recovery points 234, which are pre-determined to be located at the point in which air and air flow separation begins. The location of these points are calculated based upon airfoil structure, intended use of the aircraft, speed of flight, and others known to those skilled in the art. The precise location of these points is not specifically recited herein as several factors go into determining these, and as they will be different from airfoil to airfoil and from aircraft to aircraft. In addition, these points may vary for a single airfoil structure during the course of flight.

Unlike prior art streamlined airfoils, the present invention fluid flow regulators function to regulate, or are capable of regulating, the pressure gradients induced about airfoil 200 by facilitating pressure recovery precisely at these optimal pressure recovery points 230. Indeed, pressure recovery is increased as air 202 moves over or encounters fluid flow regulator 210. Specifically, as air 202 encounters fluid flow regulator 210-a positioned at first optimal pressure recovery point 234-a, there is a sudden and significant drop in pressure as the air 202 suddenly and instantly encounters a drop in surface 250 and 254. As such, air 202 literally falls off of pressure recovery drop 226-a, and particularly drop face 230-a. This sudden drop in pressure and the continued flow of air 202 causes a sub-atmospheric barrier or shield 238-a to be generated, which is essentially a low pressure air cushion that acts as a barrier between the molecules in the boundary layer of fluid 2 and surface 250 or 254.

Fluid flow regulator 210-a further functions to reduce pressure drag as a result of the sudden pressure drop induced at pressure recovery drop 226-a. By reducing pressure drag, pressure recovery is increased. FIG. 10-A illustrates a prior art streamlined airfoil 280, and FIG. 10-B illustrates an airfoil 200, each at positive lift. Airfoil 200 in FIG. 10-B comprises a plurality of fluid flow regulators 210 incorporated therein. As can be seen, the pressure drag on upper surface 284, lower surface 288, frontal surface 292, and tail end 296 of airfoil 280 illustrated in FIG. 10-A is much greater than the pressure drag on the similar elements of airfoil 200 of FIG. 10-B. In addition, with reference to FIG. 10-A, pressure drag 300 on airfoil 280 located at frontal surface 292 comprises a much greater magnitude than pressure drag 308 at tail end 296. This shows the imbalanced state of the airflow from the front of airfoil 280 to the rear of airfoil 280, which imbalance induces turbulent airfoil tip vortices as air 202 leaves the surface. Conversely, with reference to FIG. 10-B, pressure drag 316 on airfoil 200 located at frontal surface 258 comprises a similar magnitude as pressure drag 324 at tail end 266. This shows that fluid flow regulators 210 help to equalize the air flow 202 from the front of airfoil 200 to the rear of airfoil 200, which greater state of equilibrium significantly reduces the potential for and the magnitude of airfoil tip vortices.

The reduction in pressure drag discussed above, is a direct result of the sudden, induced pressure drop and sub-atmospheric barrier created at each pressure recovery drop of each fluid flow regulator 210, and leads to an increase in pressure recovery along the surface. An increase in pressure recovery means that the fluid about the airfoil structure is closer to a state of equilibrium.

Referring again back to FIG. 8, an increase in pressure recovery has the effect of increasing the equilibrium potential of the air flow, which therefore reduces the friction drag about airfoil 200. This is true because air molecules do not adhere or stick to other air molecules as easily as they stick to the surface molecules of airfoil 200. Instead, the air molecules essentially glide or slide over sub-atmospheric barrier 238-a with almost no disruption or turbulence, much the same way they did when equalized just prior to their encounter with airfoil 200. And, since there is little pressure drag and little friction drag, two primary contributors of laminar separation, air flow separation (both laminar and turbulent) becomes much less of a problem than with streamlined airfoil structures. As such, traditional thinking that streamlined is better is likely to be frustrated.

By reducing friction drag and subsequently increasing the attachment potential of the air boundary layer, the air flow about airfoil 200 is remarkably less turbulent, more laminar, less prone to undesirable pressure gradients, and, among others, is more easily influenced, manipulated, and predicted. Each of these function to allow airfoil 200 to be much more efficient in flight and to comprise more efficient and useful designs than streamlined airfoils. As such, it can be said that air flow about an airfoil is optimized, or that an airfoil structure's performance can be significantly enhanced. And, since air flow about airfoil 200 is optimized, there will be less disruption in air 202 as it leaves airfoil 200, which will significantly decrease airfoil tip vortices. This effect of reducing airfoil tip vortices is discussed below.

As air 202 leaves first fluid flow regulator 210-a it comprises an improved laminar and all around optimal state. However, depending upon the length of airfoil 200 and the distance air 202 has to travel prior to leaving airfoil 200 altogether, the various aerodynamic forces at work and influenced by first fluid flow regulator 210-a may again come into play, thus again disrupting fluid 202 and frustrating its optimal flow. As such, airfoil 200 comprises a second fluid flow regulator 210-b, positioned at second optimal pressure recovery point 234-b, that functions similarly to first fluid flow regulator 210-a. However, second fluid flow regulator 210-b may comprise a different design configuration, such as a shorter drop face height, depending upon the properties and characteristics of the fluid at the time it reaches optimal pressure recovery point 234-b.

Fluid flow regulator 210-c is positioned along lower or bottom surface 254 and functions to regulate pressure gradients along surface 254 in a similar manner as fluid flow regulators 210-a and 210-b on upper surface 250. Each of the fluid flow regulators on upper surface 250 are directly related to the fluid flow regulators on lower surface 254, such that when designing airfoil 200, each will be a significant factor in the design of the other. This becomes evident when one considers the fact that pressure gradients are generated on each of upper and lower surfaces 250 and 254, and that these pressure gradients control or dictate the lift characteristics of airfoil 200. Thus, it can be said that regulating these pressure gradients via one or more fluid flow regulators as taught herein also functions to influence and regulate lift.

Lift is a commonly referred to principle of aerodynamics and essentially is a force acting perpendicular to the direction of flight. Lift is equal to the fluid density multiplied by the circulation about the airfoil and the free stream velocity. Lift can also be described as the upward force created by the airflow as it passes over the airfoils. This force is the key aerodynamic force, and is opposite the weight force. For example, in straight-and-level, un-accelerated flight, an aircraft is in a state of equilibrium. The lifting force is equal to the weight of the aircraft, therefore the aircraft does not climb or dive. If the lifting force were greater than the weight, then the aircraft would climb. If the aircraft were to loose some of it's lift, it would continue to climb unless the weight of the aircraft was more than the lifting force. In this instance, the aircraft would begin to descend back to earth. Lift is generated according to the Bernoulli Principle, which describes the existing principle of pressure differential that is occurring across the airfoil structure. Simply stated, as the velocity of a fluid increases, its internal pressure decreases. A fluid flow that is traveling faster will have a smaller pressure, according to Bernoulli. Airplane airfoils are shaped to take advantage of this principle. The designed curvature on top of the airfoil causes the airflow on top of the airfoil to accelerate. This acceleration leads to a higher velocity air on top of the airfoil than on bottom, hence a lower pressure area on top of the airfoil than on bottom. The resulting pressure differential between the two airfoil surfaces is actually the phenomenon that induces the upward force called lift.

The present invention allows an even greater increase in the velocity of the fluid and a resulting decrease in the pressure across the surface of an airfoil with identical power input into the aircraft. Stated another way, the present invention creates a more efficient airfoil and aircraft in that less power is required to achieve the same amount of lift if the airfoils of the aircraft employ one or more fluid flow regulators.

Related to lift is the principle or concept of angle of attack or angle of incidence. Angle of attack may briefly be defined as the angle formed by the longitudinal axis of the aircraft with respect to the chord of the airfoil. When analyzing the flow of fluid over an airfoil, namely an airfoil, the aerodynamic forces of pressure drag and friction drag are factors of considerable importance, and factors that are considered when analyzing and determining airfoil performance at various angles of attack. At relatively small or low profile angles of attack, the boundary layers on the top and bottom surfaces of the airfoil experience only mild pressure gradients, and they remain attached along almost the entire length of the chord. The vortices that form or that are generated as the airfoil passes through the surface at these angles are much less volatile and are of a much less magnitude than those generated at higher or larger angles of attack. In addition, the drag experienced is primarily due to friction drag rather than pressure drag (viscous friction inside the boundary layer). On the other hand, as the angle of attack is increased, the pressure gradients on the surfaces of the airfoil increase in magnitude, thus decreasing the attachment potential of the fluid (or increasing the separation potential of the fluid and the boundary layer). Any separation in the fluid will result in an increase in turbulence, an increase in pressure loss, and an increase in the volatility of the vortices coming off of the airfoil. As such, the magnitude of the pressure drag increases and the flow is less than optimal. At high angles of attack, the separation potential of the fluid is increased over the top surface of the airfoil, therefore scaling the inefficiency of the airfoil as the angel of attack increases.

The present invention further functions to regulate these pressure gradients at various angles of attack, therefore increasing the efficiency of the airfoil. Stated differently, incorporating one or more fluid flow regulators on an airfoil or airfoil structure significantly improves fluid flow over that surface and at all angles of attack versus the same fluid flow over a streamlined airfoil at the same angles of attack. As such, airfoils incorporating the fluid flow regulators of the present invention provide significant advantages over prior art airfoils by first, providing improved flow and overall efficiency at given angles of attack, and second, by being able to significantly increase the angle of attack known as the stall angle of attack.

With reference to FIGS. 11-A and 11-B, illustrated is airfoil 200 comprising two different angles of attack 350, shown at angles $\theta_1$ and $\theta_2$, respectively. As can be seen, the pressure drag 354 on airfoil 200 at angle $\theta_1$ in FIG. 11-A is not much less than the pressure drag 354 on airfoil 200 at the increased angle $\theta_2$ in FIG. 11-B. The marginal difference in pressure drag is due to the optimal fluid flow created over surface 250, as well as to the fact that fluid flow regulators operate to regulate pressure gradients along the surface of airfoil 200, thus being able to exert a greater influencing force upon the pressure gradients at a larger angle of attack than is required at a lower angle of attack. This variation in treatment may be accomplished using dynamic fluid flow regulators, as discussed in detail above, in which the pressure recovery drop may be altered or adjusted on demand, as needed.

Another significant advantage of the present invention fluid control system is found in an embodiment wherein the distance or height of the drop face of each fluid flow regulator 10 may be adjusted or is adjustable, either collectively at the same time and at the same distance, or individually with each having differing heights. The fluid flow regulators 210 in FIGS. 11-A and 11-B may comprise a dynamic element that allows them to be adjustable similar to that described above. Providing adjustability in each fluid flow regulator 210 is advantageous because it is often critical or desirable to account for, accommodate, and compensate for various environmental conditions and factors, such as changing velocities, pressures, and densities of a fluid flowing over the surface of an object. These regulators may be adjusted by adjusting either the leading edge or the trailing edge, or a combination of these. Or, fluid flow regulators 210 may be adjusted using one or more types of mechanisms or systems that manipulate one or more component parts of fluid flow regulators 210. The adjustability feature becomes important when the airfoil undergoes varying changes in conditions resulting in different air flow parameters. For example, the speed and altitude of an aircraft are continually changing. Air flow should be able to be optimized at any speed or altitude, including very slow speeds and low altitudes to mach or supersonic speeds and high altitudes.

FIGS. 11-A and 11-B also illustrate pressure gradients along the bottom surface of airfoil 200 that also change according to the angle of attack, and that also may be regulated by one or more fluid flow regulators 210, as shown. Manipulation of pressure gradients along the bottom of airfoil 200 is made possible by the incorporation of one or more fluid flow regulators 210, similarly to manipulation of those pressure gradients existing on the upper surface of airfoil 200. As mentioned above, optimizing fluid flow and regulating pressure gradients along the surfaces of airfoil 200 using one or more fluid flow regulators allows airfoil 200 to experience greater angles of attack than would otherwise be possible.

Hydrofoils Comprising a Fluid Flow Regulating System and Method

The discussion above on airfoils is equally applicable to hydrofoils with one notable difference—the fluid medium. Airfoils are subject to gaseous fluids, such as air of some other type of gas. On the other hand, hydrofoils are subject to liquid fluids, such as water. Although the design of airfoils and hydrofoils may differ slightly or significantly, each is a foil over which fluid passes. As such, the discussion above pertaining to airfoils is incorporated herein in its entirety.

As hydrofoils are subject to liquid fluids, it follows that the behavior of the fluid about the hydrofoil will be different. This is in large part due to the density, viscosity, and compressibility of liquids.

As fluid passes over the surface of a hydrofoil, the molecules in the fluid move around the hydrofoil. The density of the fluid is such that pressure gradients induced are less significant or pronounced than with air. Stated differently, the forces acting upon the object moving through the liquid are much less than they would be with air because the fluid is essentially in a more compressed state and it requires a great deal of disturbance to upset the equilibrium of these molecules. As the pressure gradients and the forces acting upon the object are less pronounced, it follows that the pressure recovery needed to optimize the fluid and keep the fluid attached will also be less than with air. In addition, because liquids are more dense than air, there is a greater tendency for the liquid to remain constant and uncompressed, even at higher velocities. As such, fluid flow regulators may be designed to account for the different densities of various liquids. For example, the drop face in the pressure recovery drop of an object subject to a liquid fluid medium will comprise a smaller distance than would be required for the same object subject to a gaseous medium. This is true because the amount of pressure recovery needed to maintain the attachment of the liquid fluid and to reduce liquid separation is less due to the fact that the forces acting upon the object as it passes through the liquid are much less, and therefore, a smaller degree or magnitude of counteracting forces is needed to create and maintain optimal fluid flow.

It should be noted that the present invention is applicable to airfoils and hydrofoils of any shape, size, and/or geometry and to airfoils and hydrofoils for any application or operating environment.

Moreover, the present invention is applicable to foils of any type and for any application. As such, there are several specific foils discussed in further detail below, wherein these foils may be suitable for either a liquid medium, a gaseous or air medium, or both. Particularly, the present invention features a propeller blade, a fan blade, a turbine blade, a rotor blade, and an impeller blade, each comprising one or more fluid flow regulators.

Foils in Rotary Devices

The present invention airfoils and hydrofoils discussed above are similar to the blades, vanes, rotors, and other similar structures that are apart of various rotating or rotary devices. As such, the general term "foil" as described herein pertains to airfoils, hydrofoils, and the various fluid bearing structures found in rotary devices. Several such rotary devices are provided below.

Propeller

The present invention features a propeller and propeller rotor or blade comprising or featuring one or more fluid flow regulators to influence and optimize fluid flow over the blades, and to improve the efficiency of the propeller. The invention is applicable for propellers intended for use within gaseous (e.g., air) mediums (airplane propellers), as well as propellers intended to be used within liquid (e.g., water) mediums (e.g., boat, ship, and various watercraft propellers).

Propellers and other similar rotary devices (i.e., those discussed below) are designed to convert the useful energy of the powering means, such as a motor, into thrust to either push or pull a craft through the fluid medium. In case of a plane, the positioning of the propeller on the front of the airplane effectively pulls the airplane through the air, while on a boat, because the propeller is located in the rear of the boat, the propeller effectively pushes the boat through the water.

With reference to FIG. 12-A, shown is an exemplary boat propeller 450, which comprises a plurality of blades 454-a, 454-b, and 454-c attached to a center hub 458 that rotates as indicated. As propeller 450 rotates within water 2, water 2 flows over the surfaces of blades 454. As such, blades 454 comprise at least one, and preferably two, fluid flow regulators 410 formed or featured within their surfaces.

FIG. 12-B illustrates a side view of propeller 450, with a cross-section of blade 454 taken along its chord. As blade 454 rotates, it displaces water 2 and forces or pushes water 2 down and back, thus creating a high pressure gradient along the upper surface, or pressure surface 462, of blade 454. At the same time, a low pressure gradient is created along the lower surface, or suction surface 466, of blade 454, wherein water 2 will move in behind blade 454 to try and fill the low pressure area created by the downward moving blade. The different pressures along pressure surface 462 and suction surface 466 result in a pressure differential between pressure surface 462 and suction surface 466-a positive force (the pushing effect) on suction surface 466, and a negative force (the pulling effect) on pressure surface 462. As such, thrust is generated and the boat or ship propelled forward. These forces are similar to those operating on the airfoils discussed above. This same effect is created on each of blades 454 as propeller 450 rotates within water 2.

Stated differently, the pressure differential between pressure and suction surfaces 462 and 466, respectively, causes water 2 to be drawn into propeller 450 from the front 470 due to the low pressure underneath blades 454, and accelerate out the aft 474 due to the higher pressure ahead. As such, propeller 450 functions much like a fan that pulls air in from the behind, and blows it out the front. Propeller 450 pulls water in from the front, and as propeller 450 rotates, water accelerates through and around blades 454, thus creating a stream of higher-velocity water behind propeller 450. This action of pulling water in and pushing it out at a higher velocity is known as adding momentum to the water, while the change in momentum or acceleration of the water results in thrust force.

In FIG. 12-B, blade 454 comprises a different shape along its chord, such that suction surface 466 has a more prominent camber or curvature to its shape than pressure surface 462. This curvature creates the low pressure experienced on suction surface 466, thus inducing lift, similar to the wing on an airplane. Of course with propeller 450, the resulting force is not really lift, but is rather translated into a horizontal movement or thrust component.

Propeller 450 moves though the water in a similar manner as a mechanical screw moves forward through a piece of wood. As such, the distance or forward motion depends mainly on the pitch of each blade 454 of propeller 450. Pitch is commonly known and generally defined herein as the distance propeller 450 moves after one complete revolution, and is related to the angle at which the blades are oriented or positioned on central hub 458. The fluid flow regulators may be designed to follow or conform to pitch.

FIG. 12-B further illustrates blades 454 comprising a plurality of fluid flow regulators 410-*a* and 410-*b*. Fluid flow regulators 410 are placed at optimal pressure recovery points 434 along either or both of pressure and suction surfaces 462 and 466, and function as described above. Specifically, fluid flow regulators 410-*a* and 410-*b* each comprise a pressure recovery drop 426-*a* and 426-*b*, respectively, that allows the pressure gradients and water flow over pressure and suction surfaces to be optimized. As water flows over each of pressure and suction surfaces 462 and 466, it encounters fluid flow regulators 410-*a* and 410-*b*, wherein a sudden decrease in pressure is induced and sub-atmospheric barriers 438-*a* and 438-*b* are created. As such, these fluid flow regulators 410 reduce the drag along pressure and suction surfaces 462 and 466, wherein the potential for pressure recovery is increased. As pressure recovery is increased, friction drag is also decreased, which significantly reduces the separation and separation potential of water 2 and makes flow of fluid 2 much more optimal.

The particular propeller described and illustrated above is merely provided as one exemplary embodiment employing the present invention fluid flow regulators. Indeed, several other sized, shaped, and otherwise designed propellers exist, whether intended for a specific or general purpose. As such, the present invention is not limited to the specific type of propeller described and shown herein. As one ordinarily skilled in the art will recognize, any propeller design will be able make use of and benefit from the present invention fluid flow regulators.

Fan and Fan Blade

The present invention further features a fan and fan rotor or blade comprising or featuring one or more fluid flow regulators to influence and optimize fluid flow over the blades, and to improve the efficiency of the fan. The present invention is particularly applicable for fans intended for use within gaseous (e.g., air) mediums. Moreover, high pressure and low pressure fans are also contemplated. The present invention technology is equally applicable to axial-flow fans, centrifugal-flow fans, and/or mixed-flow fans.

Figure 13:
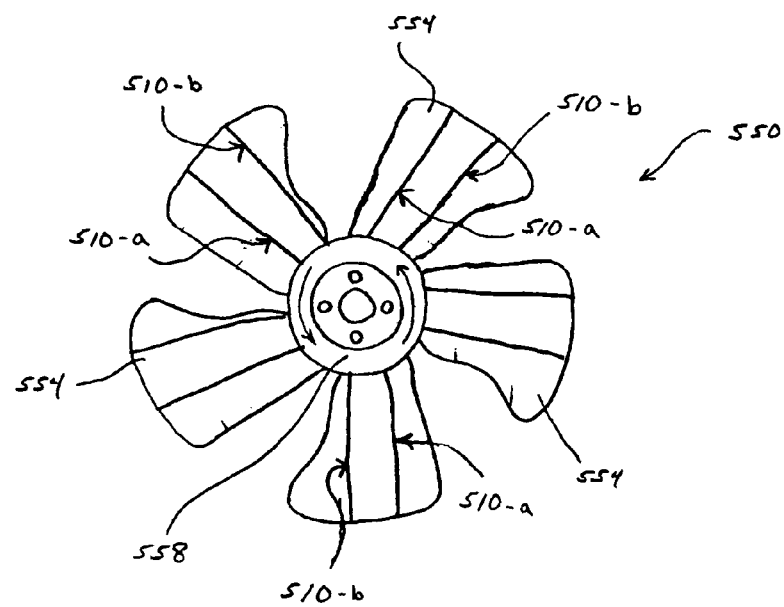
FIG. 13-A illustrates an isometric view of a fan comprising or featuring a plurality of fluid flow regulators according to one exemplary embodiment of the present invention.

FIG. 13-A illustrates a front view of an axial-flow fan 550 having a plurality of blades 554 attached to a rotating center hub 558. FIG. 13-A further illustrates blades 554 comprising or featuring one or more fluid flow regulators 510, shown as fluid flow regulators 510-*a* and 510-*b*. An axial-flow fan in its simplest from consists of a rotor made up of number of blades fitted to the hub. When it is rotated by an electric motor or any other drive, a flow is established through the rotor. The actions of the rotor cause an increase in the stagnation pressure of air or gas across it. Thus, the present invention functions, among other things, to regulate this stagnation pressure.

FIG. 13-B illustrates a side view of fan 550 and a cross-section of blade 554. FIG. 13-B further illustrates fluid flow regulators 510-*a* and 510-*b* positioned at optimal pressure recovery points 534-*a* and 534-*b* along pressure surface 562 that is opposite suction surface 566, and oriented perpendicular to the direction of flow of fluid 2 as fan 550 is caused to rotate. Fluid flow regulators 510-*a* and 510-*b* each comprise the elements described above, namely pressure recovery drops 526-*a* and 526-*b* and sub-atmospheric barriers 538-*a* and 538-*b*.

As the design, function, and operation of fans and fan blades is similar to propellers, a detailed discussion of the dynamics of fans is not presented herein. Rather, the description, elements, features, effects, and advantages discussed above for propellers comprising one or more fluid flow regulators, as well as those generally discussed herein, is/are incorporated herein as they pertain to fans and fan blades.

The following example represents application of the present invention fluid flow regulators to one exemplary fan and the experiments conducted using the fan, as well as the results obtained. This example is not intended to limit the present invention in any way as one ordinarily skilled in the art will recognize perhaps several other obvious applications and structures to which the present invention may apply.

EXAMPLE ONE

For this experiment, two 20" Lakewood axial-flow window fans were purchased. These fans have five vanes that are approximately 0.045 thick and a ½ Hp motor. The guards from both fans were removed and the fan blades of each modified to remove the plastic flashing, thus making the blades as uniform to each other as possible. This was done by de-burring the plastic flashing. Then, one of the fans was taken and each blade thereon modified to comprise a single fluid flow regulator integrally formed into the pressure surface of each blade using a hot knife to put a pressure recovery drop on each of the five blades. Each pressure recovery drop was oriented longitudinally along the length of the blade so as to be perpendicular to fluid flow as the fan blades rotate.

As each fan comprised the same motor, the fans were then switched on. For each fan, several performance characteristics were tested and several measurements taken for each of these, including the amp draw, air velocity, temperature, and RPM.

The results of the tests were as follows. The first thing discovered was a significant reduction in sound. The fan comprising the unmodified, standard fan blades was much noisier than the modified fan comprising the fluid flow regulators. The difference in noise was estimated at about 80%. The amp draw for each fan was then tested and found to be the same for each fan. Although the modified fan felt like it was generating more thrust, the air velocity seemed to be higher on the standard fan. This was later investigated further as discussed below. The temperature of the modified fan air exhaust was about two degrees cooler than the standard fan. And, the RPM of the standard fan was about fifteen percent (15%) faster than the modified fan.

As the modified fan felt like it was generating more thrust, the two fans were placed face to face. The result was instantly noticeable as the modified fan nearly toppled the standard fan. It was then concluded that the modified fan was rotating slower than the standard fan because it was displacing a greater volume of air than the standard fan. To verify this, a sheet was placed above each fan at its face. The sheet leading from the modified fan filled with much more air than did the sheet leading from the standard fan. As such, it was concluded that the presence of one or more fluid flow regulators as discussed herein functioned to improve the air flow over the fan by optimizing the air flow and decreasing the separation of the air from the surface of the fan. All of this, in turn, functioned to improve the efficiency of the fan.

Indeed, the fan was able to turn slower, thus conserving power, produce more thrust, displace a greater volume of air, and cool the exhaust—each significant and attractive advantages.

The particular fan described and illustrated above is merely provided as one exemplary embodiment employing the present invention fluid flow regulators. Indeed, several other sized, shaped, and otherwise designed fans exist, whether intended for a specific or general purpose. As such, the present invention is not limited to the specific type of fan described and shown herein. As one ordinarily skilled in the art will recognize, any fan design will be able make use of and benefit from the present invention fluid flow regulators.

Rotor System ands Rotor Blade

The present invention further features a rotor system and rotor blade comprising or featuring one or more fluid flow regulators to influence and optimize fluid flow over the blades, and to improve the efficiency of the rotor system. The present invention is applicable for rotor systems particularly intended for use within gaseous (e.g., air) mediums, such as a helicopter rotor system (both main and tail rotors).

Rotor systems depend primarily on rotation to produce relative fluid flow that develops or creates the aerodynamic forces required for flight. Because of its rotation, rotor systems are subject to forces and moments distinctive to all rotating masses. One of the forces produced is centrifugal force, and is defined as the force that tends to make rotating bodies move away from the center of rotation. Another force produced in the rotor system is centripetal force, which is defined as the force that counteracts centrifugal force by keeping an object a certain radius from the axis of rotation. As an example, the rotating blades of a helicopter produce very high centrifugal loads on the rotor head and blade attachment assemblies. The vertical force causing lift in a helicopter is produced when the blades assume a positive angle of attack. The horizontal force propelling the helicopter forward is caused by the centrifugal force induced by the rotation of the rotors. As such, there are several aerodynamic forces at work.

FIGS. 14-A, 14-B, and 14-C illustrate an exemplary rotor that would be utilized on a helicopter. Specifically, these Figures illustrate rotor system 650, and particularly rotor blade 654, as comprising a plurality of fluid flow regulators 610 positioned at optimal pressure recovery points 634. Fluid flow regulators are shown comprising a pressure recovery drop 626, and a sub-atmospheric barrier 638, each of which function as described herein.

FIG. 14-A illustrates rotor system 650 comprising first and second rotors, 654-a and 654-b, attached to a rotor mast 656 via a yoke 658. Rotors 654 comprise a plurality of fluid flow regulators 610 therein that are positioned along upper surface 662 at an optimal pressure recovery point 630, and oriented so as to be perpendicular to the flow of air 2 as rotor system 650 rotates.

FIG. 14-B illustrates a cross-sectional view of rotor 654 at a zero or positive lift (shown as $\theta_1$). FIG. 14-B also illustrates fluid flow actuators 610-c placed along lower surface 666. FIG. 14-C illustrates a similar cross-sectional view of rotor 654, but at a significantly higher angle of attack (shown as $\theta_2$) than the rotor shown in FIG. 14-B. Rotor system 650 and rotor blades 654 function similar to the airfoil discussed above, and thus is not described in any more detail here.

Essentially, the fluid flow regulators 610 function as described above to regulate the pressure gradients along the surfaces of the rotor as needed to maintain fluid attachment and to optimize the fluid flow over rotor system 650.

However, it is believed that the present invention fluid flow actuators provide several additional advantages for rotor systems (and all rotating members intended for fluid flow). As pressure is regulated across the surfaces of the rotors and fluid flow optimized by the fluid flow regulators, the total RPM of the rotor may be decreased to displace the same amount of volume of air as prior art rotor systems. An increase in air displacement therefore produces a more significant amount of thrust, all while requiring less power to operate the rotor system. Moreover, it is believed that the centrifugal force produced is increased due to the greater displacement of fluid volume.

Rotor tip vortices are one of the most significant aerodynamic features of a helicopter rotor wake. In the contrast to fixed-wing aircraft where the tip vortices trail down stream, rotor tip vortices can remain in close proximity of the rotor for a significant time. As such, they are key factors in determining the rotor performance, local blade loads and aeroacoustics noise. Therefore, accurate prediction of the wake geometries is required. A more detailed discussion of rotor vortices (or rather blade vortices pertaining to various rotary devices) is provided below.

The particular rotor described and illustrated above is merely provided as one exemplary embodiment employing the present invention fluid flow regulators. Indeed, several other sized, shaped, and otherwise designed rotors exist, whether intended for a specific or general purpose. As such, the present invention is not limited to the specific type of rotor described and shown herein. As one ordinarily skilled in the art will recognize, any rotor design will be able make use of and benefit from the present invention fluid flow regulators.

Impeller

The present invention further features an impeller and impeller blade comprising or featuring one or more fluid flow regulators to influence and optimize fluid flow over the blades, and to improve the efficiency of the impeller. The present invention is applicable for impellers intended for use within gaseous (e.g., air) mediums, as well as impellers intended to be used within liquid (e.g., water) mediums.

FIG. 15-A illustrates a front view of an mixed-flow impeller 750 having a plurality of blades 754 attached to a rotating center hub or spindle 758. FIG. 15-A further illustrates blades 754 comprising or featuring one or more fluid flow regulators 710, shown as fluid flow regulators 710-a and 710-b.

FIG. 15-B illustrates a side view of impeller 750 and a cross-section of blade 754. FIG. 15-B further illustrates fluid flow regulators 710-a and 710-b positioned at optimal pressure recovery points 734-a and 734-b along pressure surface 762 that is opposite suction surface 766, and oriented perpendicular to the direction of flow of fluid 2 as impeller 750 is caused to rotate. Fluid flow regulators 710-a and 710-b each comprise the elements described above, namely pressure recovery drops 726-a and 726-b and sub-atmospheric barriers 738-a and 738-b.

As the design, function, and operation of impellers and impeller blades is similar to propellers and fans, a detailed discussion of the dynamics of impellers is not presented herein. Rather, the description, elements, features, effects, and advantages discussed above for propellers and fans comprising one or more fluid flow regulators, as well as those generally discussed herein, is/are incorporated herein as they pertain to impellers and impeller blades.

The particular impeller described and illustrated above is merely provided as one exemplary embodiment employing the present invention fluid flow regulators. Indeed, several other sized, shaped, and otherwise designed impellers exist, whether intended for a specific or general purpose. As such, the present invention is not limited to the specific type of impeller described and shown herein. As one ordinarily skilled in the art will recognize, any impeller design will be able make use of and benefit from the present invention fluid flow regulators.

Turbine

The present invention further features a turbine and turbine rotor or blade comprising or featuring one or more fluid flow regulators to influence and optimize fluid flow over the blades, and to improve the efficiency of the turbine. The present invention is applicable for turbines intended for use within gaseous (e.g., air) mediums, as well as turbines intended to be used within liquid (e.g., water) mediums.

FIG. 16-A illustrates a front view of a mixed-flow turbine 850 having a plurality of blades 854 attached to a rotating center hub or spindle 858. FIG. 16-A further illustrates blades 854 comprising or featuring one or more fluid flow regulators 810, shown as fluid flow regulators 810-a and 810-b.

FIG. 16-B illustrates a side view of turbine 850 and a cross-section of blade 854. FIG. 16-B further illustrates fluid flow regulators 810-a and 810-b positioned at optimal pressure recovery points 834-a and 834-b along pressure surface 862 that is opposite suction surface 866, and oriented perpendicular to the direction of flow of fluid 2 as turbine 850 is caused to rotate. Fluid flow regulators 810-a and 810-b each comprise the elements described above, namely pressure recovery drops 826-a and 826-b and sub-atmospheric barriers 838-a and 838-b.

As the design, function, and operation of turbines and turbine blades is similar to propellers, fans, and impellers, a detailed discussion of the dynamics of turbines is not presented herein. Rather, the description, elements, features, effects, and advantages discussed above for propellers, fans, and impellers comprising one or more fluid flow regulators, as well as those generally discussed herein, is/are incorporated herein as they pertain to turbines and turbine blades.

The particular turbine described and illustrated above is merely provided as one exemplary embodiment employing the present invention fluid flow regulators. Indeed, several other sized, shaped, and otherwise designed turbines exist, whether intended for a specific or general purpose. As such, the present invention is not limited to the specific type of turbine described and shown herein. As one ordinarily skilled in the art will recognize, any turbine design will be able make use of and benefit from the present invention fluid flow regulators.

FIGS. 17-A and 17-B illustrate front views of two identical type axial-flow fans 550-a and 550-b, respectively, each comprising a plurality of vanes or blades 554. With reference to FIG. 17-A, blades 554 of fan 550-a comprise a streamlined design, such that if a cross-section of blade 554 was taken, each surface of blade 554 would reveal a smooth or streamlined design.

On the other hand, with reference to FIG. 17-B, blades 554 of fan 550-b each comprise a plurality of fluid flow regulators 510-a and 510-b featured on either the pressure surface, or suction surface, or both, of blades 554.

The purpose of FIGS. 17-A and 17-B is to illustrate the difference in the generation and potential for vane or rotor or blade tip vortices 580 induced by the rotation of each of fans 550-a and 550-b, between the streamlined blades of fan 550-a, and the blades of fan 550-b comprising fluid flow regulators 510. Each of these designs generate vane or blade tip vortices, but in much different magnitudes. Blade tip vortices are the result of high pressure air under the blades spilling around and over the blade tips to equalize the low pressure area above the upper surface, wherein the high pressure air is induced by blade tip velocities and other forces. Blade tip vortices are common in the art and numerous design and situational considerations have been impacted and implemented as a result of these. Moreover, experts have only been able to marginally reduce these vortices with various devices or systems and they remain a major consideration in the design of different fan, propeller, turbine, and other similar rotary devices.

As can be seen, blades 554 of fan 550-a comprise a streamlined design that induces large and volatile or turbulent vortices 580 as fluid leaves the surface of blades 554. These large and volatile vortices are a direct result of the imbalanced fluid flow and pressure differentials across the upper and lower or pressure and suction surfaces of blades 554, and particularly, to the greater pressure drag existing at the frontal surface than that at the rear or tail (see FIGS. 10-A and 10-B and the description pertaining to these). Due to these differentials and imbalances, as the fluid leaves the tail of blades 554 it does so violently, thus creating a large vortex 580.

On the other hand, blades 554 of fan 550-b each comprise a plurality of fluid flow regulators 510 that, among other things, function to create a greater equilibrium in pressure drag between the frontal surface and the tail end of blades 554, as well as to regulate pressure along the upper and lower surfaces of blades 554 (again, see FIGS. 10-A and 10-B and the description pertaining to these). All of this drastically reduces the separation of the fluid from the blades, resulting in more laminar, optimized flow. The regulation of pressure, the greater equilibrium created in the fluid flow, and the generally optimal fluid flow generated by fluid flow regulators 510 substantially reduces the blade tip vortex potential of blades 554. As shown, the vortices 580 generated from fluid leaving the surface of blades 554 are much smaller and much less volatile as the transition from blade to air is made smoother and much less violent by the fluid flow regulators.

It should be noted that each of the devices discussed and illustrated herein, namely airfoils, hydrofoils, and the several rotary devices or systems may comprise any number of fluid flow regulators, preferably positioned at various optimal pressure recovery points, wherein these regulators may be sized and shaped, and oriented in any direction relative to fluid flow as needed or required. As such, those shown above are not intended to be accurate, but merely represent exemplary configurations. The specific orientation, number, and design of fluid flow regulators for any given device will most likely be a strategic determination that requires significant research, study, experimentation, and analysis and will be apparent to one skilled in the art.

The advantages of providing one or more fluid flow regulators on one or more surfaces of the rotating or rotary devices described above are several, namely those discussed above. In addition, several other advantages are also recognized. First, pertaining to fans, propellers, turbines, etc., because of the optimized fluid flow, a greater volume of fluid moved through these devices. This is accomplished by increasing the attachment of the fluid as it passes over the surface, or, in other words, decreasing the separation of the fluid, thus increasing the resultant velocity of the fluid. As such, a greater amount of fluid is displace using the same power input, which also suggests that these devices are much more efficient than prior art designs. Second, there is more thrust because there is more fluid volume being displaced. Third, as stated, less energy is required to push the same amount of fluid as with prior art propellers. Fourth, the blade or vane vortices are significantly reduced due to the more attached and laminar flow of the fluid, as well as the more equalized pressure gradients along the surfaces of the blades of each device, as well as between the front and aft sections.

Another significant advantage and one that warrants farther discussion is that the present invention fluid flow regulators are responsible for significantly reducing the sound or noise caused or induced by the rotating or rotary devices discussed above. The origins and main features of aerodynamically generated sound are typically described in terms of a combination of both fluid dynamics and acoustics. These are, for example, flow separation, and flow instability, and vortices on the one hand, coupled with the hydrodynamic flows of acoustic monopoles, dipoles, and quadpoles on the other. With an emphasis on the vortex theory of aerodynamic sound, various theoretical approaches are generally described in physical terms and are illustrated by a variety of sound-generating flows, some of which may be classified as free flows with no solid surfaces present (spinning vortices, turbulent jet noise, supersonic jet screech), flows over rigid surfaces (boundary layer noise, whistling telephone wires, edge tones, pipe tones, and whistling, organ pipes), interaction with steadily moving surfaces (helicopter blade slap, fan blade interaction), and flow with excited surfaces (interior aircraft boundary layer noise, Aeolian tones, etc.). Some of these involved no resonance at all, while others have flow resonance, acoustic resonance or mechanical vibration or resonance. The present invention functions to optimize fluid flow by reducing the separation and separation potential of the fluid via the regulation of the pressure gradients across the surface. As such, a significant result of this is a noticeable reduction in sound, which may be considered extremely advantageous for many applications. For example, one particular application in which noise is a considerable problem and in which any noise reduction will be a significant benefit is in jet engines. As such, utilizing one or more fluid flow regulating devices as described herein on the various component parts of a jet engine (e.g., turbine blades, fan blades, diffuser vanes, pumps, exhaust systems, nozzles, compressors, injectors, etc.) will significantly improve the efficiency of the jet engine, as well as significantly reduce the noise induced by the jet engine.

Other advantages may be recognized by one ordinarily skilled in the art and those specifically recited herein should not be construed as limiting in any way. The present invention further features a method for improving or optimizing the fluid flow over a foil, for influencing the magnitude and rate of pressure recovery along the foil, and for optimizing the performance of a foil subject to fluid flow. The method comprises the steps of: featuring at least one fluid flow regulator with one or more surfaces of a foil, said fluid flow regulator comprising a pressure recovery drop having at least one drop face formed therein, wherein the drop face comprises a calculated height; subjecting the foil to a fluid, such that the fluid is caused to move about the foil; and causing the fluid to encounter the fluid flow regulator, such that the pressure recovery drop induces a sudden drop in pressure as the fluid flows over the fluid flow regulator, wherein a sub-atmospheric barrier is created at the base of the drop face, the fluid flow regulator functioning to regulate pressure gradients and optimize fluid flow about the foil, thus increasing the performance of the foil in the fluid. Pressure recovery drop is preferably positioned at or near an optimal pressure recovery point. Pressure recovery drop may also be repositioned to another location in response to varying conditions surrounding the fluid flow. The method further comprises the step of varying the pressure recovery drop, and particularly the height of the drop face, in response to changing conditions.

Basically, causing the fluid to encounter a fluid flow regulator has the effect of optimizing fluid flow and the performance of the foil within the fluid. Specifically, the fluid flow regulator functions to regulate the pressure gradients that exist along the surface by reducing the pressure drag at various locations along the surface, as well as the pressure drag induced forward and aft of the foil, via a pressure recovery drop. This function increases pressure recovery and pressure recovery potential as a result of regulating the pressure gradients and reducing the pressure drag, which reduces friction drag along the surface as a result of increasing the pressure recovery. All of these function to significantly decrease fluid separation and fluid separation potential.

The present invention further features a method for improving or optimizing the fluid flow over a foil subject to fluid flow and for optimizing the performance of a structure, body, device, or system comprising the foil. The method comprises the steps of obtaining a foil having at least one surface subject to fluid flow; featuring at least one fluid flow regulator with the surface; and subjecting the foil to air flow. The fluid flow regulator comprises all of the elements described herein, and functions as described herein. All of the features, functions, elements, and advantages discussed above and herein are hereby incorporated into the foregoing method.

The present invention may be embodied in other specific forms without departing from its spirit or essential characteristics. In addition, the described embodiments are to be considered in all respects only as illustrative and not restrictive. As such, the scope of the invention is indicated by the appended claims, rather than by the foregoing description. All changes which come within the meaning and range of equivalency of the claims are to be embraced within their scope.

What is claimed and desired to be secured by Letters Patent is:

1. An airfoil comprising:
   a frontal surface that leads through a fluid;
   an first surface relating with said frontal surface that receives fluid flow thereon;
   a second surface opposite said first surface and relating with said frontal surface, said second surface also receiving fluid thereon;
   a airfoil tip relating to said first and second surfaces that releases fluid from said airfoil; and
   at least one fluid flow regulator featured and operable with said first surface, said fluid flow regulator comprising a leading edge, a trailing edge, and a pressure recovery drop extending between said leading and trailing edges to form a down step, said pressure recovery drop comprising at least one drop face of a calculated height formed therein, said fluid flow regulator functioning to optimize air flow, reduce separation of said fluid over said first surface of said airfoil, and reduce induced noise, wherein said fluid flow regulator is removably attached to said first surface.

2. The airfoil of claim 1, further comprising at least one fluid flow regulator featured and operable with said second surface.

3. The airfoil of claim 1, wherein said fluid flow regulator is integrally formed with said first surface.

4. The airfoil of claim 1, wherein said first surface is comprised of more than one fluid flow regulator.

5. The airfoil of claim 1, wherein said fluid flow regulator is positioned in an orientation selected from the group consisting of perpendicular to the direction of flow of said fluid, substantially perpendicular to the direction of flow of said fluid, on an angle with respect to said direction of flow of said fluid, parallel or substantially parallel to the direction of flow of said fluid, and any combination of these.

6. The airfoil of claim 1, wherein said fluid flow regulator comprises a formation selected from the group consisting of linear, curved, spline, and any combination of these.

7. The airfoil of claim 1, wherein said fluid flow regulator is positioned at or proximate an optimal pressure recovery point at which point there is an imbalanced or unequal pressure gradient forward and aft of said fluid, thus creating an adverse pressure about said airfoil, which adverse pressure gradient induces friction and pressure drag that ultimately increases the separation potential of said fluid.

8. The airfoil of claim 1, wherein said fluid flow regulator comprises a dynamic fluid flow regulator that functions to vary the height of said at least one drop face.

9. The airfoil of claim 8, wherein said dynamic fluid flow regulator inconsistently varies the height of said drop face along the length of said pressure recovery drop.

10. The airfoil of claim 1, wherein said fluid flow regulator comprises means for effectuating vector positioning about said airfoil.

11. The airfoil of claim 1, wherein said pressure recovery drop comprises an orthogonal design.

12. The airfoil of claim 1, wherein said first and second surfaces comprise a plurality of said fluid flow regulators.

13. The airfoil of claim 1, wherein said airfoil is selected from the group consisting of a fan blade, a rotor, a turbine blade, a blower blade, an impeller, a propeller, and any other similar airfoils.

14. An airfoil comprising:
a frontal surface that leads through a fluid;
an first surface relating with said frontal surface that receives fluid flow thereon;
a second surface opposite said first surface and relating with said frontal surface, said second surface also receiving fluid thereon;
a airfoil tip relating to said first and second surfaces that releases fluid from said airfoil; and
at least one fluid flow regulator featured and operable with said first surface, said fluid flow regulator comprising a leading edge, a trailing edge, and a pressure recovery drop extending between said leading and trailing edges to form a down step, said pressure recovery drop comprising at least one drop face of a calculated height formed therein, said fluid flow regulator functioning to optimize air flow, reduce separation of said fluid over said first surface of said airfoil, and reduce induced noise, wherein said fluid flow regulator comprises means for effectuating vector positioning about said airfoil.

15. The airfoil of claim 1, further comprising a sub-atmospheric barrier that is suddenly generated as said fluid encounters and flows over said pressure recovery drop, said sub-atmospheric barrier comprising a low pressure area of fluid molecules having decreased kinetic energy that serve as a cushion between said higher kinetic energy fluid molecules in said fluid and the molecules at said surface to facilitate laminar flow and assist in the reduction of the separation potential of said fluid.

16. The airfoil of claim 14, further comprising at least one fluid flow regulator featured and operable with said second surface.

17. The airfoil of claim 14, wherein said fluid flow regulator is integrally formed with said first surface.

18. The airfoil of claim 14, wherein said fluid flow regulator is removably attached to said first surface.

19. The airfoil of claim 14, wherein said fluid flow regulator is positioned in an orientation selected from the group consisting of perpendicular to the direction of flow of said fluid, substantially perpendicular to the direction of flow of said fluid, on an angle with respect to said direction of flow of said fluid, parallel or substantially parallel to the direction of flow of said fluid, and any combination of these.

20. The airfoil of claim 14, wherein said fluid flow regulator comprises a formation selected from the group consisting of linear, curved, spline, and any combination of these.

21. The airfoil of claim 14, wherein said fluid flow regulator is positioned at or proximate an optimal pressure recovery point at which point there is an imbalanced or unequal pressure gradient forward and aft of said fluid, thus creating an adverse pressure about said airfoil, which adverse pressure gradient induces friction and pressure drag that ultimately increases the separation potential of said fluid.

22. The airfoil of claim 14, wherein said fluid flow regulator comprises a dynamic fluid flow regulator that functions to vary the height of said at least one drop face.

23. The airfoil of claim 22, wherein said dynamic fluid flow regulator inconsistently varies the height of said drop face along the length of said pressure recovery drop.

24. The airfoil of claim 14, wherein said first surface is comprised of more than one fluid flow regulator.

25. The airfoil of claim 14, wherein said pressure recovery drop comprises an orthogonal design.

26. The airfoil of claim 14, wherein said first and second surfaces comprise a plurality of said fluid flow regulators.

27. The airfoil of claim 14, wherein said airfoil is selected from the group consisting of a fan blade, a rotor, a turbine blade, a blower blade, an impeller, a propeller, and any other similar airfoils.

28. The airfoil of claim 14, further comprising a sub-atmospheric barrier that is suddenly generated as said fluid encounters and flows over said pressure recovery drop, said sub-atmospheric barrier comprising a low pressure area of fluid molecules having decreased kinetic energy that serve as a cushion between said higher kinetic energy fluid molecules in said fluid and the molecules at said surface to facilitate laminar flow and assist in the reduction of the separation potential of said fluid.

29. A hydrofoil comprising:
a frontal surface that leads through a liquid;
an first surface relating with said frontal surface that receives liquid flow thereon;
a second surface opposite said first surface and relating with said frontal surface, said second surface also receiving said liquid thereon;
a hydrofoil tip relating to said first and second surfaces that releases said liquid from said hydrofoil; and
at least one fluid flow regulator featured and operable with said first surface, said fluid flow regulator comprising a leading edge, a trailing edge, and a pressure recovery drop extending between said leading and trailing edges to form a down step, said pressure recovery drop comprising at least one drop face of a calculated height formed therein, said fluid flow regulator functioning to optimize liquid flow, reduce separation of said liquid over said first surface of said hydrofoil, and reduce induced noise, wherein said fluid flow regulator is removably attached to said first surface.

30. The hydrofoil of claim 18, further comprising at least one fluid flow regulator featured and operable with said second surface.

31. The hydrofoil of claim 18, wherein said fluid flow regulator is integrally formed with said first surface.

32. The hydrofoil of claim 18, wherein said first surface is comprised of more than one fluid flow regulator.

33. The hydrofoil of claim 18, wherein said fluid flow regulator is positioned in an orientation selected from the group consisting of perpendicular to the direction of flow of said liquid, substantially perpendicular to the direction of flow of said liquid, on an angle with respect to said direction of flow of said liquid, parallel or substantially parallel to the direction of flow of said liquid, and any combination of these.

34. The hydrofoil of claim 18, wherein said fluid flow regulator comprises a formation selected from the group consisting of linear, curved, spline, and any combination of these.

35. The hydrofoil of claim 18, wherein said fluid flow regulator is positioned at or proximate an optimal pressure recovery point as the location(s) about said surface at which there is an imbalanced or unequal pressure gradient forward and aft of said fluid, thus creating an adverse pressure about said hydrofoil, which adverse pressure gradient induces friction and pressure drag that ultimately increases the separation potential of said fluid.

36. The hydrofoil of claim 18, wherein said fluid flow regulator comprises a dynamic fluid flow regulator that functions to vary the height of said at least one drop face.

37. The hydrofoil of claim 36, wherein said dynamic fluid flow regulator inconsistently varies the height of said drop face along the length of said pressure recovery drop.

38. The hydrofoil of claim 18, wherein said fluid flow regulator comprises means for effectuating vector positioning about said hydrofoil.

39. The hydrofoil of claim 18, wherein said pressure recovery drop comprises an orthogonal design.

40. The hydrofoil of claim 18, wherein said first and second surfaces comprise a plurality of said fluid flow regulators.

41. The hydrofoil of claim 18, wherein said hydrofoil is selected from the group consisting of a fan blade, a rotor, a turbine blade, an impeller, a propeller, and any other similar hydrofoils.

42. The hydrofoil of claim 18, further comprising a sub-atmospheric barrier that is suddenly generated as said liquid encounters and flows over said pressure recovery drop, said sub-atmospheric barrier comprising a low pressure area of liquid molecules having decreased kinetic energy that serve as a cushion between said higher kinetic energy liquid molecules in said liquid and the molecules at said surface to facilitate laminar flow and assist in the reduction of the separation potential of said liquid.

* * * * *